United States Patent
Zeif

(10) Patent No.: US 7,209,859 B2
(45) Date of Patent: Apr. 24, 2007

(54) METHOD AND APPARATUS FOR SEQUENTIALLY COLLECTING AND ANALYZING REAL TIME DATA WITH INTERACTIVE MONITORING

(75) Inventor: Alex G. Zeif, Summerville, SC (US)

(73) Assignee: Linxberg Technology, LLC, Brooklyn, NY (US)

( * ) Notice: Subject to any disclaimer, the term of this patent is extended or adjusted under 35 U.S.C. 154(b) by 550 days.

(21) Appl. No.: 10/090,102

(22) Filed: Mar. 2, 2002

(65) Prior Publication Data

US 2003/0167238 A1    Sep. 4, 2003

(51) Int. Cl.
*G06F 19/00* (2006.01)

(52) U.S. Cl. .................. 702/182; 702/81; 705/400; 700/108; 700/111

(58) Field of Classification Search .................. 702/81, 702/83, 84, 182; 705/11, 400; 700/108, 700/111
See application file for complete search history.

(56) References Cited

U.S. PATENT DOCUMENTS

| | | |
|---|---|---|
| 4,718,025 A | 1/1988 | Minor et al. |
| 4,802,094 A | 1/1989 | Nakamura et al. |
| 4,956,783 A | 9/1990 | Teranishi et al. |
| 5,479,361 A | 12/1995 | Kurtzberg et al. |
| 5,586,041 A | 12/1996 | Mangrulkar |
| 5,691,895 A | 11/1997 | Kurtzberg et al. |
| 5,821,990 A | 10/1998 | Rudt et al. |
| 5,862,054 A | 1/1999 | Li |
| 5,896,293 A | 4/1999 | Teramoto et al. |
| 5,946,661 A | 8/1999 | Rothschild et al. |
| 5,970,476 A | 10/1999 | Fahey |
| 6,038,486 A | 3/2000 | Saitoh et al. |
| 6,115,643 A * | 9/2000 | Stine et al. .................. 700/110 |
| 6,128,540 A | 10/2000 | Van Der Vegt et al. |
| 6,144,885 A | 11/2000 | Scarrah |
| 6,211,905 B1 | 4/2001 | Rudt et al. |
| 6,249,715 B1 | 6/2001 | Yuri et al. |
| 6,295,510 B1 | 9/2001 | Discenzo |
| 6,381,509 B1 | 4/2002 | Thiel et al. |
| 6,415,191 B1 | 7/2002 | Pryor |
| 6,539,271 B2 * | 3/2003 | Lech et al. .................. 700/108 |
| 2001/0025225 A1 | 9/2001 | Ota et al. |
| 2002/0038235 A1* | 3/2002 | Musafia et al. ............... 705/11 |
| 2002/0071603 A1 | 6/2002 | Ungpiyakul et al. |
| 2002/0077711 A1* | 6/2002 | Nixon et al. .................. 700/51 |
| 2002/0138169 A1* | 9/2002 | Sakaguchi .................. 700/108 |
| 2003/0004765 A1* | 1/2003 | Wiegand ....................... 705/7 |
| 2004/0102924 A1* | 5/2004 | Jarrell et al. ................. 702/181 |

OTHER PUBLICATIONS

Szabados, "Intelligent Monitoring System Used to Control Asynchronous Production Systems", IEEE, May 19-20, 2001.*

(Continued)

*Primary Examiner*—Patrick J. Assouad
(74) *Attorney, Agent, or Firm*—Fay Kaplun & Marcin, LLP

(57) ABSTRACT

A system, comprising a plurality of slave devices collecting real time data from process stations, a master device receiving the collected data from the plurality of slave devices, wherein the master device polls the plurality of slave devices in a predetermined order and an analysis device processing the collected data and producing output data as a function of the collected data.

19 Claims, 31 Drawing Sheets

OTHER PUBLICATIONS

Lin et al., "A PC-Based Real Time Measurement System for Factory Automation on Quality Control and Production Control", IEEE, 1989.*

Hersh Kohli et. al, E-manufacturing Software for Product and Process Real-time Monitoring, 5 pages, http://www.manufacturingpulse.com/news_events/smta_oct_2001_manufacturing_pulse.pdf.

Gensym Corp., Real-time Monitoring Diagnosis, Control and Process Optimization, 3 pages http://www.gensym.com/manufacturing/.

Syscon Int'l, Inc., Data Collection Modules, 4 pages, http://www.syscon-plantstar.com/literature/dcm.pdf.

* cited by examiner

| | | | | | | | | | |
|---|---|---|---|---|---|---|---|---|---|
| 844 | Set-up time | Personal Equipment Repair Time | | | | | | | |
| | | Technician ID | | | | | | | |
| 843 | | PM Dead time | | | | | | | |
| 842 | | PM time | | | | | | | |
| 841 | Set-up time | Material | | | | | | | |
| | | Tool/Machine | | | | | | | |
| 840 | Operator | Undefined | | | | | | | |
| | | QC Problem | | | | | | | |
| | | Tool failure | | | | | | | |
| | | Machine failure | | | | | | | |
| | | No Material | | | | | | | |
| | | No Operator | | | | | | | |
| 839 | Production Run time | | | | | | | | |
| 838 | Schedule Shift time | | | | | | | | |
| 837 | Parts Produced | | | | | | | | |
| 836 | Operator | Personal Equipment Time | | | | | | | |
| | | ID | | | | | | | |
| 835 | Work Post (Equipment) ID | | | | | | | | |
| 834 | Operation ID | | | | | | | | |
| 833 | Part ID | | | | | | | | |
| 832 | Job Order | | | | | | | | |
| 831 | CT Current Time | | | | | | | | |

| ABC Corporation | Employees Passports | | | | | | |
|---|---|---|---|---|---|---|---|
| Plant | Employee | Period | Sort | Edit | New | Copy | Delete | Print |

| ID | Name | Division | Position | Hourly Rate | Date of Hire | Seniority |
|---|---|---|---|---|---|---|
| 20356 | Bob G Smith | Machining | Operator | 7.25 | 10/23/99 | 3 |
| 20357 | Tom Parker | Machining | Line Lieder | 10.50 | 03/04/98 | 5 |
| 20358 | Jim Eagle | Machining | Operator | 8.50 | 05/06/98 | 4 |
| 20359 | Bill Carter | Machining | Operator | 6.00 | 10/01/01 | 1 |

Details

| | | | |
|---|---|---|---|
| ID | 20358 | Hourly Rate | 8.50 |
| Name | Jim Eagle | Date of Hire | 05/06/98 |
| Division | Machining | Seniority | 4 |
| Position | Operator | | |
| Description | Needs close supervision | | |

OK   Cancel

FIG. 8

Table Format Schedule 350

ABC Enterprises Scheduling

351 — FIRST SHIFT

| 04/24/01 | 04/25/01 | 04/26/01 | 04/27/01 | 04/28/01 | 4/24-4/28 |

|  | Monday | | Tuesday | | Wednesday | | Thursday | | Friday | | TOTAL PER WEEK | |
|---|---|---|---|---|---|---|---|---|---|---|---|---|
|  | Type | Quant. | Type | Quant. | Type | Quant. | Type | Quant. | Type | Quant. | Type | Quant. |
| 361 — Press Line | PR33 | 1250 | PR33 | 1250 | PR33 | 1250 | PR33 | 1250 | PR33 | 1250 | PR33 | 6250 |
| 362 — Weld Line | XE42 | 1250 | XE42 | 1250 | XE42 | 1250 | XE42 | 1250 | XE42 | 1250 | XE42 | 6250 |
| 363 — Trim Line | PL2 | 1250 | PL2 | 1250 | PL2 | 1250 | PL2 | 1250 | PL2 | 1250 | PL2 | 6250 |
| 364 — Paint Line | F6U3 | 1250 | F6P2 | 1250 | F2Y7 | 1250 | R1B1 | 1250 | B6W2 | 1250 | B6W2 | 6250 |
| 365 — Packaging Line | F6U3 | 1250 | F6P2 | 1250 | F2Y7 | 1250 | R1B1 | 1250 | B6W2 | 1250 | B6W2 | 6250 |

352 — SECOND SHIFT

| 04/24/01 | 04/25/01 | 04/26/01 | 04/27/01 | 04/28/01 | 4/24-4/28 |

|  | Monday | | Tuesday | | Wednesday | | Thursday | | Friday | | TOTAL PER WEEK | |
|---|---|---|---|---|---|---|---|---|---|---|---|---|
|  | Type | Quant. | Type | Quant. | Type | Quant. | Type | Quant. | Type | Quant. | Type | Quant. |
| 361 — Press Line | PR33 | 1250 | PR33 | 1250 | PR33 | 1250 | PR33 | 1250 | PR33 | 1250 | PR33 | 6250 |
| 362 — Weld Line | XE42 | 1250 | XE42 | 1250 | XE42 | 1250 | XE42 | 1250 | XE42 | 1250 | XE42 | 6250 |
| 363 — Trim Line | PL2 | 1250 | PL2 | 1250 | PL2 | 1250 | PL2 | 1250 | PL2 | 1250 | PL2 | 6250 |
| 364 — Paint Line | F6U3 | 1250 | F6P2 | 1250 | F2Y7 | 1250 | R1B1 | 1250 | B6W2 | 1250 | B6W2 | 6250 |
| 365 — Packaging Line | F6U3 | 1250 | F6P2 | 1250 | F2Y7 | 1250 | R1B1 | 1250 | B6W2 | 1250 | B6W2 | 6250 |

FIG. 12

ABC Enterprises Product Flow Tracking

| date | day | daily production value | total production value | scheduled production value | percent manufactured |
|---|---|---|---|---|---|
| 03/27/01 | tue | 8500 | 8500 | 10000 | 85% |
| 03/28/01 | wed | 10000 | 18500 | 20000 | 93% |
| 03/29/01 | thurs | 9100 | 27600 | 30000 | 92% |
| 03/30/01 | fri | 10000 | 37600 | 40000 | 94% |
| 03/31/01 | sat | 0 | 37600 | 40000 | 94% |
| 04/01/01 | sun | 0 | 37600 | 40000 | 94% |
| 04/02/01 | mon | 10000 | 47600 | 50000 | 95% |
| 04/03/01 | tue | 10000 | 57600 | 60000 | 96% |
| 04/04/01 | wed | 9000 | 66600 | 70000 | 95% |
| 04/05/01 | thurs | 10000 | 76600 | 80000 | 96% |
| 04/06/01 | fri | 10000 | 86600 | 90000 | 96% |
| 04/07/01 | sat | 0 | 86600 | 90000 | 96% |
| 04/08/01 | sun | 0 | 86600 | 90000 | 96% |
| 04/09/01 | mon | 10000 | 96600 | 100000 | 97% |
| 04/10/01 | tue | 91000 | 105700 | 110000 | 96% |
| 04/11/01 | wed | 10000 | 115700 | 120000 | 96% |
| 04/12/01 | thurs | 9510 | 125210 | 130000 | 96% |
| 04/13/01 | fri | 10000 | 135210 | 140000 | 97% |
| 04/14/01 | sat | 0 | 135210 | 140000 | 97% |
| 04/15/01 | sun | 0 | 135210 | 140000 | 97% |
| 04/16/01 | mon | 10000 | 145210 | 150000 | 97% |
| 04/17/01 | tue | 10000 | 155210 | 160000 | 97% |
| 04/18/01 | wed | 98000 | 165010 | 170000 | 97% |
| 04/19/01 | thurs | 10000 | 175010 | 180000 | 97% |
| 04/20/01 | fri | 10000 | 185010 | 190000 | 97% |
| 04/21/01 | sat | 0 | 185010 | 190000 | 97% |
| 04/22/01 | sun | 0 | 185010 | 190000 | 97% |
| 04/23/01 | mon | 10000 | 195010 | 200000 | 98% |
| 04/24/01 | tue | 9850 | 204860 | 210000 | 98% |
| 04/25/01 | wed | 9853 | 214713 | 220000 | 98% |
| 04/26/01 | thurs | 10000 | 224713 | 230000 | 98% |
| 04/27/01 | fri | 10000 | 234713 | 240000 | 98% |

FIG. 13b

Employees Utilization and Performance Tracking
File  Company  Product  Employees  Period  Analysis Subdivision #        Date        Shift

| Employee | Post # | Total Time | Active Time | Inactive Time | Efficiency |
|---|---|---|---|---|---|
| John | 101 | 5:36 | 4:46 | 0:50 | 79% |
| Mary | 102 | 5:34 | 5:04 | 0:30 | 97% |
| Kathy | 103 | 5:05 | 3:25 | 1:40 | 95% |
| Jack | 104 | 5:51 | 5:35 | 0:16 | 101% |
| Sally | 105 | 2:25 | 2:40 | 0:15 | 105% |
| Bob | 106 | 6:07 | 5:17 | 0:50 | 76% |
| Jim | 110 | 5:29 | 4:48 | 0:41 | 82% |
| Ali-Baba | 111 | 5:44 | 5:32 | 0:12 | 104% |
| Tom | 112 | 5:36 | 4:46 | 0:50 | 79% |
| Bo | 113 | 5:34 | 5:04 | 0:30 | 97% |
| Kit | 114 | 5:05 | 3:26 | 1:39 | 95% |
| Ron | 115 | 5:51 | 5:36 | 0:15 | 101% |
| Nick | 116 | 2:55 | 2:40 | 0:15 | 105% |
| Alex | 120 | 6:07 | 5:17 | 0:50 | 76% |
| Jay | 121 | 5:27 | 4:48 | 0:41 | 82% |
| Stive | 122 | 5:44 | 5:32 | 0:12 | 104% |
| Joe | 123 | 5:29 | 4:48 | 0:41 | 82% |
| Baba | 124 | 5:44 | 5:32 | 0:12 | 104% |
| Bill | 125 | 5:36 | 4:46 | 0:50 | 79% |
| Boss | 126 | 5:34 | 5:04 | 0:30 | 97% |
| Tim | 127 | 5:05 | 3:26 | 1:39 | 95% |

FIG. 16a

Maintenance Efficiency Tracking
File  Company  Product  Employee  Period  Analysis                 Date                Shift

| Post ID | Available Time | Down Time | | Repair Time | | Reaction Time | |
|---|---|---|---|---|---|---|---|
| | | min | % | min | % | min | % |
| 1 | 480 | 140 | 29% | 112 | 23% | 28 | 6% |
| 2 | 480 | 53 | 11% | 38 | 8% | 15 | 3% |
| 3 | 480 | 20 | 4% | 18 | 4% | 2 | 0% |
| 4 | 480 | 48 | 10% | 41 | 9% | 7 | 1% |
| 5 | 480 | 6 | 1% | 5 | 1% | 1 | 0% |
| 6 | 480 | 128 | 27% | 101 | 21% | 27 | 6% |
| 7 | 480 | 128 | 27% | 101 | 21% | 27 | 6% |
| 8 | 480 | 12 | 3% | 10 | 2% | 2 | 0% |
| 9 | 480 | 59 | 12% | 44 | 9% | 15 | 3% |
| 10 | 480 | 140 | 29% | 112 | 23% | 28 | 6% |
| 11 | 480 | 53 | 11% | 38 | 8% | 15 | 3% |
| 12 | 480 | 20 | 4% | 18 | 4% | 2 | 0% |
| 13 | 480 | 48 | 10% | 41 | 9% | 7 | 1% |
| 14 | 480 | 6 | 1% | 5 | 1% | 1 | 0% |
| 15 | 480 | 128 | 27% | 101 | 21% | 27 | 6% |
| 16 | 480 | 128 | 27% | 101 | 21% | 27 | 6% |
| 17 | 480 | 12 | 3% | 10 | 2% | 2 | 0% |
| 18 | 480 | 59 | 12% | 44 | 9% | 15 | 3% |
| 19 | 480 | 48 | 10% | 41 | 9% | 7 | 1% |

METHOD AND APPARATUS FOR SEQUENTIALLY COLLECTING AND ANALYZING REAL TIME DATA WITH INTERACTIVE MONITORING

BACKGROUND INFORMATION

A fundamental shift in the global manufacturing sector from a labor intensive market to an information intensive market is occurring for a variety of reasons. For example, in the past, businesses have placed their manufacturing facilities in developing countries with extensive labor pools. However, as these countries begin to industrialize, the cost of labor increases and, therefore, the cost of manufacturing increases. In order to control the cost of manufacturing, the businesses are forced to lower the cost of production in the current location or move to a new location. As the list of stable developing countries begins to shrink, the moving of manufacturing locations to such countries becomes less attractive. The cost of moving, building a new facility and training new workers, along with the political uncertainty in a large number of developing nations having an available labor pool, militates towards increasing productivity and lowering costs at existing facilities or building new facilities where the labor costs are high (e.g., United States, Japan, Germany, etc), but the labor pool is skilled and the political environment is stable.

Thus, companies must utilize technology to cut costs and improve efficiency in order to remain competitive. Information intensive programs such as just-in-time (JIT) inventory and total quality manufacturing have allowed for such cost cutting and efficiency improvements in many facilities. However, as the global manufacturing market becomes more competitive, new ideas for using information are needed to continue to fuel efficiency improvements in the manufacturing sector.

SUMMARY OF THE INVENTION

A system, comprising a plurality of slave devices collecting real time data from process stations, a master device receiving the collected data from the plurality of slave devices, wherein the master device polls the plurality of slave devices in a predetermined order and an analysis device processing the collected data and producing output data as a function of the collected data.

In addition, an apparatus, comprising an allocation arrangement receiving equipment status data, the allocation arrangement including a manual input and an automatic input for receiving the equipment status data, wherein the equipment status data includes operation mode data, a card reader obtaining employee data from an employee identification, a part counter receiving sensor data, and an interactive screen displaying messages. The apparatus further includes a processing device receiving one of the employee data, the sensor data, the equipment status data and the operation mode data, wherein the processing device processes the one of the received data for transmission to an information collection device.

Furthermore, a method, comprising the steps of collecting real time production information from a plurality of slave devices, polling the slave devices in a predetermined order by a master device, wherein the master device initiates the polling of the slave devices by communicating with each of the slave devices in the predetermined order during a request period, transmitting the real time production information by each of the slave devices to the master device during a response period corresponding to the request period for each of the slave devices, and processing the real time production information to generate automated tracking data.

Also, a method, comprising the steps of collecting real time production information via a data collection unit, the unit including a card reader, a part counter, a mode switch and a processing device, transmitting the real time production information to a master device, further transmitting the real time production information from the master device to a control station and processing the real time production information at the control station to generate automated tracking data.

In addition, a method, comprising the steps of collecting real time material information from a production line and analyzing the real time material information to determine a material cost. Collecting real time operator information from the production line and analyzing the real time operator information to determine an operator cost. Collecting real time equipment information from the production line and analyzing the real time equipment information to determine an equipment cost. Collecting real time indirect cost information from the production line and analyzing the real time indirect cost information to determine an indirect cost. Determining an actual production cost as a function of the material cost, the operator cost, the equipment cost and the indirect cost and generating cost comparison data as a function of the actual production cost and a scheduled production cost.

BRIEF DESCRIPTION OF DRAWINGS

FIG. 7 shows an exemplary automatic collected data table according to the present invention;

FIG. 8 shows an exemplary graphical user interface screen for displaying employee passport information according to the present invention;

FIG. 12 shows an exemplary table format schedule generated by the scheduling module according to the present invention;

FIGS. 13*a–b* show exemplary graphical user interfaces displaying product flow tracking information according to the present invention;

FIGS. 16a–d show exemplary graphical user interfaces displaying employee utilization and performance tracking information according to the present invention;

FIGS. 17a–e show exemplary graphical user interfaces displaying maintenance efficiency tracking information according to the present invention;

FIGS. 18a–b show exemplary graphical user interfaces displaying share of blame tracking information according to the present invention;

DETAILED DESCRIPTION

Figure 1:
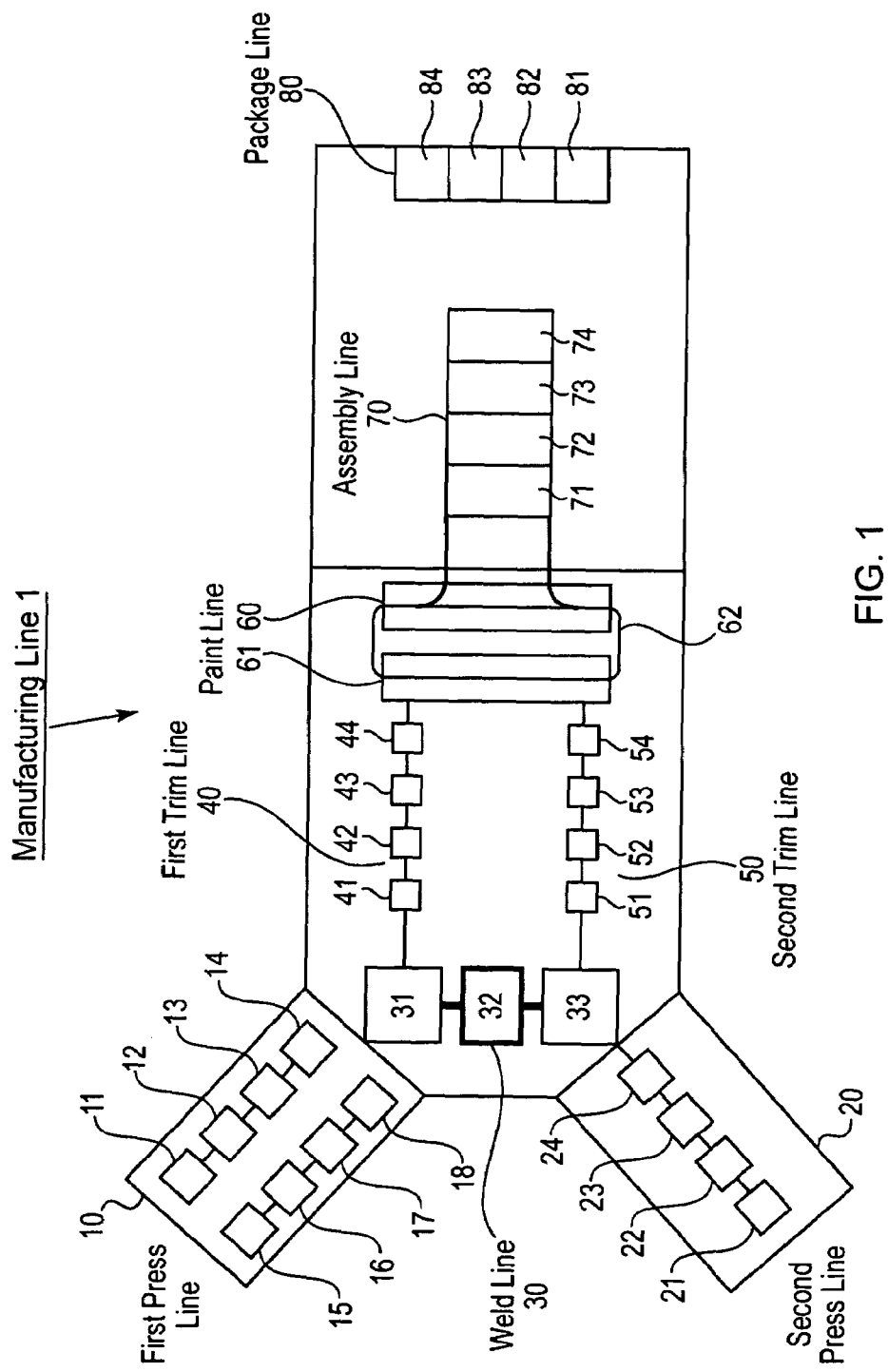
FIG. 1 shows a block diagram illustrating an exemplary manufacturing line in a manufacturing facility.

The present invention may be further understood with reference to the following description of preferred exemplary embodiments and the related appended drawings, wherein like elements are provided with the same reference numerals. It should be understood that the following exemplary embodiments of the present invention are presented for a basic manufacturing facility. However, the present invention may be applied to the manufacturing of any goods, for example, automobiles, electronic devices, consumer goods, pharmaceutical products, etc. Furthermore, the present invention may also be applied to service facilities not engaged in the manufacture of goods. Thus, the terms parts, units, and products, as used throughout this description, refers to the item or a component of the item that is being produced at the facility. The item may be any tangible good, such as described above, or even a commodity, such as electricity. In addition, the terms data and information are used throughout this description interchangeably.

FIG. 1 shows a block diagram illustrating an exemplary manufacturing line 1 in a manufacturing facility. The first leg of the manufacturing line 1 is a first press line 10 having stations 11–18. The stations 11–18 may be manual stations, semi-automatic stations, automatic stations or any combination thereof. For example, a manual station may be where an employee initiates preparation of raw material for processing on the manufacturing line 1, e.g., the loading of raw material into a hopper or moving line, the weighing of a specified amount of raw material, etc. A semi-automatic station may be where an operator is operating a machine or piece of equipment to work on the raw material or a workpiece, e.g., a drill press, a saw, a manual mixing machine, etc. An automatic station may be where a machine or piece of equipment operates on the raw material without the intervention of an operator e.g., an electronic milling machine, etc. These automatic stations are typically computer or microprocessor controlled and require an operator to program and maintain the stations, but do not need an operator during normal operation. A typical advanced manufacturing line may have more automatic stations than manual stations. However, those of skill in the art will understand that the present invention is equally applicable to both highly advanced automated lines and more traditional lines that rely on more operator intervention.

The manufacturing line 1 also contains a second press line 20 having stations 21–24. The press lines 10–20 feed into a weld line 30 having stations 31–33 where the materials from the first press line 10 and the second press line 20 are welded. The first press line 10 feeds the materials to the station 31 and the second press line 20 feeds the materials to the station 33. The actual welding of the materials is performed at the station 32. Once again, the welding station 32 may be manual (e.g., an operator is performing manual welding) or automatic (e.g., the welding is performed by a robotic welding arm). The parts are then fed to a first trim line 40 having stations 41–44 or a second trim line 50 having stations 51–54. The parts are processed on the trim lines 40, 50 (e.g., cleaned after welding, cut to correct size, etc.) and then continue to a paint line 60. The parts are painted at either one of stations 61, 62 of the paint line 60.

The parts are then moved on to an assembly line 70 having stations 71–74 where the parts are assembled into the finished product. Once again, the stations 71–74 (or any of the stations on the trim lines 40, 50 or the paint line 60), may be manual, semi-automatic or automatic depending on the task that needs to be performed at the particular station. The finished product moves from the assembly line 70 to the package line 80 having stations 81–84. In the package line 80, the finished product is prepared to be shipped to the customer (e.g., finished product testing, placing product in containers or boxes, etc.). The product may then be shipped to the customer.

Those of skill in the art will understand that the above description for the manufacturing line 1 is only exemplary and there are many kinds of manufacturing lines that contain some, all or none of the lines described. For example, in a chemical plant, the entire manufacturing process may be carried out in an automatic batch process in a series of tanks. In a computer manufacturing facility, the entire manufacturing process may be simply receiving parts from suppliers and assembling the parts into the final product. Similarly, in an auto manufacturing plant, parts are received from suppliers and assembled along an assembly line into an automobile. In a pharmaceutical facility, there may be a combination of weighing powdered raw materials and processing the raw materials in a series of processes to make the powdered material into tablets and bottling the tablets. In other words, every manufacturing facility may have a unique series of steps to carry out to produce the final product. However, in each case, the manufacturing process is a series of steps or processes carried out to make a raw material or a collection of parts into the final product. The present invention may be applied equally to any manufacturing process.

Figure 2:
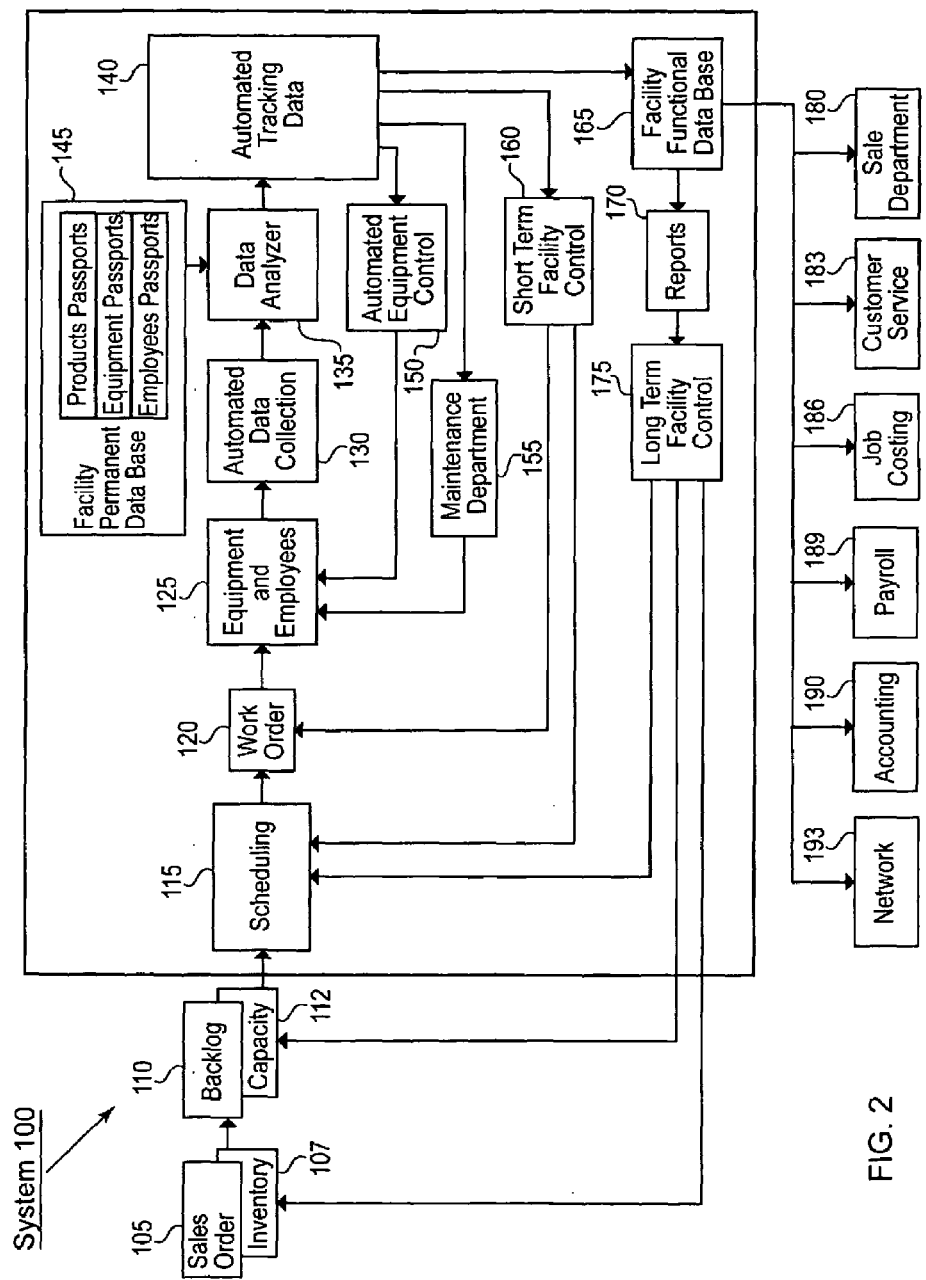
FIG. 2 shows an exemplary system flow according to the present invention.

FIG. 2 shows a system 100 for an exemplary embodiment of the present invention. Each of the blocks in FIG. 2 may be considered as a module that carries out an exemplary step or process as described. Those skilled in the art will understand that any single device may contain one or more of the described modules and that one or more of the modules may be contained in a single product, e.g., software package. A sales order module 105 generates a sales order for a specified quantity of the finished product manufactured by the facility based on sales information provided by, for example, a sales department 180. An inventory module 107 compares the sales order to the existing inventory to determine if this particular order may be fulfilled using existing inventory. As shown in FIG. 2, the inventory control may be a function of the data generated by a long term facility control (LTFC) module 175 which uses the data generated from the current manufacturing process to control several functions of the manufacturing process. The LTFC module 175 uses the data from current and past manufacturing processes to perform control over long term functions associated with the manufacturing process in order to provide a more efficient process. The LTFC module 175 will be described in greater detail below.

The system 100 flow then continues to a backlog module 110 where the backlog of the facility is determined, i.e., the number and type of components that need to be produced in order to fulfill the current orders. The backlog module 100 may determine the backlog in conjunction with a facility capacity module 112, which is also a function of the LTFC module 175. The facility capacity is the amount of finished product the facility can manufacture in a specified period of time (e.g., the facility can produce 500 units during an eight hour shift). This determination of facility capacity is determined based on the manufacturing data contained in the LTFC module 175. The backlog module 110 may determine the backlog by using the facility capacity from the facility capacity module 112 along with the number of units needed to fulfill the sales order generated by the sales order module 105 less any units that may be fulfilled by existing inventory as determined in the inventory module 107. For example, if the sales order is for 10,000 units and the existing inventory is 2,000 units, then the manufacturing backlog is 8,000 units. If, as in the above example, the facility capacity is 500 units per eight hour shift, the backlog in terms of shifts is sixteen (16) eight hour shifts.

The system 100 flow then continues to a scheduling module 115 where the manufacturing schedule may be generated. The scheduling module 115 is designed to automatically resolve bottlenecks and ensure on-time completion of the desired tasks based on real time monitoring and data input from the manufacturing line. In order to fully describe the functions of the scheduling module 115, a short description of the real time monitoring and data input is provided. Referring to equipment and employee module 125, the facility contains equipment and employees. For example, referring to FIG. 1, the station 11 of the first press line 10 may have an employee who loads raw material onto the line, the station 12 may have an employee operating a first machine to form the raw material and the station 13 may have another employee operating a second machine to perform a second forming process on the raw material. Finally, the station 14 may have a second employee who inspects the formed raw material before it is sent to the weld line 30.

As the employees and machines are performing their designated tasks, there may be monitoring equipment that is collecting real time data on the process as shown in automated data collection (ADC) module 130 of FIG. 2. There may be a series of monitoring equipment that monitors both the employees and the equipment. For example, there may be a bar code reader through which the employees swipe an employee card that shows when the employees are on the shop floor or even at their individual stations. There may also be a scale or other device to show how much raw material the first employee is loading onto the first press line 10 at the station 11. Similarly, the second employee at the station 14 may have a weighed or bar coded scrap bin to show the number or weight of the formed material that does not pass inspection. Conversely, a first sensor may count the number of units entering the station 14 and a second sensor may count the number of units leaving the station 14 to determine the pass/fail ratio of the units. Similarly, there may be sensors that count the number and frequency of the units that leave the machines of the stations 12, 14 or the machines may have internal sensors that record the number and frequency of operations performed. In addition, the internal sensors may detect diagnostic information for the machine such as electrical load, pressure, temperature, etc. Those skilled in the art will understand that the data described above is only exemplary and there are a multitude of sensors that may be employed to collect data from the entire manufacturing line. Exemplary sensors and data collection will be described in more detail below.

The data collected at the various locations throughout the facility by the ADC module 130 is sent to a data analyzer module 135 (e.g., the processor of a computing station). Those of skill in the art will understand that the data analyzer module 135 does not necessarily mean a central computer system for the facility, it may also include a series of distributed computing or processing devices and off-site computing facilities. The data analyzer module 135 compares and analyzes the data from the ADC module 135 and the data contained in a factory permanent database (FPD) module 145 to obtain automated tracking data 140 including real time product flow tracking and machine and employee condition tracking data. A more detailed description of the FPD module 145 and the automated tracking data 140 is provided below. However, this data, in general, gives a real time snapshot of the current conditions of the manufacturing process which may then be used to more efficiently control the manufacturing process both in the short term and the long term. The automated tracking data 140 is then directed to various locations such as an automated equipment control (AEC) module 150, a maintenance department module 155, a short term facility control (STFC) module 160 and a facility functional database (FFD) module 165. The facility report module 170 generates reports from the data contained in the FFD module 165 and passes the information to the LTFC module 175. The series of real time tracking data is collected by the FFD module 165 and stored in the LTFC module 175 resulting in a historical record of the facility data.

This overview of the entire system 100 flow leads back to the scheduling module 115 which receives inputs from the facility capacity module 112, the LTFC module 175 and the STFC module 160. The input of facility capacity module 112 may include information on the backlog from the module 110, the inventory from the module 107 and the sales order module 105. As described above, the LTFC module 175 and the STFC module 160 receive information based on the real time monitoring of the manufacturing process. Thus, the scheduling module 115 can account for all this data when generating a schedule for the facility. For example, because the facility capacity data is based on the historic facility data from the LTFC module 175, the scheduling module 115 may perform true capacity scheduling based on the historical data (i.e., if the historical data from the LTFC module 175 shows that facility capacity is 500 units per eight hour shift, scheduling module 115 can accurately schedule production for that number of units per shift).

The LTFC module 175 may also contain data for individual stations or equipment which allows for the scheduling of tasks in a particular order or at a particular time during the shift. For example, the delivery of a sufficient quantity of raw materials to the press lines 10 and 20, the delivery of a particular paint color to the paint line 60, the scheduling of an employee at first station for a portion of the shift and at a second station for a remainder of the shift, etc. It also allows for the scheduling for the production of one particular sales order versus other sales orders based on the delivery dates for the sales orders. For example, a first received sales order may have a later delivery date than a second received sales order. The scheduling module 115 can evaluate the sales order information and reschedule the production such that the units for the second sales order are produced first, if needed, to fulfill the sales order on schedule. Those skilled in the art will understand that the scheduling module 115 may account for any number of scheduling contingencies based on the historical data from the LTFC module 175.

However, the scheduling module 115 also receives data from the STFC module 160 which may include additional real time data as opposed to the more historical data provided by the LTFC module 175. This real time data allows scheduling module 115 to react immediately to actual facility conditions by updating the schedule in real time. For example, the real time data may indicate that the machine at the station 12 on the first press line 10 has had a failure. The scheduling module 115 may generate a new schedule that increases production at the stations 15–18 of first press line 10 to account for the slowing of production at the stations 11–14 because of the equipment failure. This increase in production at the stations 15–18 may also cause scheduling module 115 to generate a new schedule for the delivery of raw material to the station 15 to keep up with the increased production and the shifting of employees from the stations 11–14. Another example may be that the real time data indicates that the weld line 30 may be operating slower than scheduled capacity, thus causing a bottleneck in production. This bottleneck is reported and the scheduling module 115 may reschedule other tasks to account for the bottleneck. The reporting function will be described in greater detail below.

The real time data may also indicate that the manufacturing line 1 is operating more efficiently than scheduled capacity (i.e., more finished goods are being produced than expected). In this case, the scheduling module 115 may reschedule tasks based on the more efficient operation (e.g., deliver more packing material to the package line 80, begin production of a new sales order, etc.). The scheduling module 115 may also forecast delivery dates based on the real time data which may indicate a late delivery that can be cured before the actual delivery date is missed. Those skilled in the art will understand that the scheduling module 115 may account for any number of scheduling contingencies based on the real time data from the STFC module 160.

FIG. 12 shows an exemplary table format schedule 350 generated by the scheduling module 115. The schedule 350 shows a five day production schedule for two shifts for the manufacturing line 1. The first portion 351 shows the schedule for the first shift at the facility for each of the five lines 361–365. As shown in the first shift portion 351, each line has been scheduled for a particular type operation on 1,250 units on each day. The press line 361, weld line 362 and trim line 363 are scheduled for the same type operation in each of the five days as shown by the types PR33, XE42 and PL2, respectively. Whereas, the paint line 364 and packaging line 365 are scheduled for different operations on each of the five successive days as shown by the types F6U3 (Monday), F6P2 (Tuesday), F2Y7 (Wednesday), R1B1 (Thursday) and B6W2 (Friday). In this example, the press line 361, weld line 362 and trim line 363 may be making the exact same unit on each of the days. Whereas, the paint line 364 may be painting the units a different color each day and, therefore, the packaging line 365 is putting the different color units in different boxes, accounting for the different operations for the paint line 364 and packaging line 365. Similar to the first shift portion 351 of the schedule 350, the second shift portion 352 of the schedule 350 provides a production schedule fo the five lines 361–365. Those of skill in the art will understand that the schedule 350 is only exemplary and that scheduling module 115 may generate any number of different scheduling formats. For example, the schedule may be in a graph format, in column and row format, bar chart format, a string format for export, etc. In addition, the schedule may provide more detail, such as showing a scheduling production for each of the stations at the facility, or less detail.

The work order module 120 generates work orders for the employees and equipment based on the schedules generated by the scheduling module 115 and the real time data provided by the STFC module 160. As described above, the scheduling module 115 may generate schedules based on the historical data from the LTFC module 175 and scheduling updates based on the real time data from the STFC module 160. However, the work order module 120 generates the work orders for the employees and equipment to implement the schedule produced by the scheduling module 115. As shown in FIG. 2, the equipment and employees module 125 receive work orders from the work order module 120. For example, the employee at the station 11 of the first press line 10 may receive a work order to load a specified amount of raw material onto the first press line 10 in order to meet the production schedule generated by scheduling module 115. The work order may go directly to the employee or to the employee's supervisor. For a piece of equipment, the work order module 120 may interface directly with the equipment to instruct the equipment or there may be a human operator interface which implements the work order for the equipment. Thus, the scheduling module 115 and the work order module 120 operate in conjunction to control the current operation of the manufacturing line 1.

As described above, a work order generated by the work order module 120 is carried out by the employees and equipment module 125 on the manufacturing line 1. While the employee and equipment module 125 is implementing the work orders, the ADC module 130 is collecting data on the work being performed by the employees and equipment module 125. The following figures will describe in more detail exemplary hardware systems for collecting data from the employee and equipment module 125 and analyzing the data from the manufacturing line 1.

Figure 3:
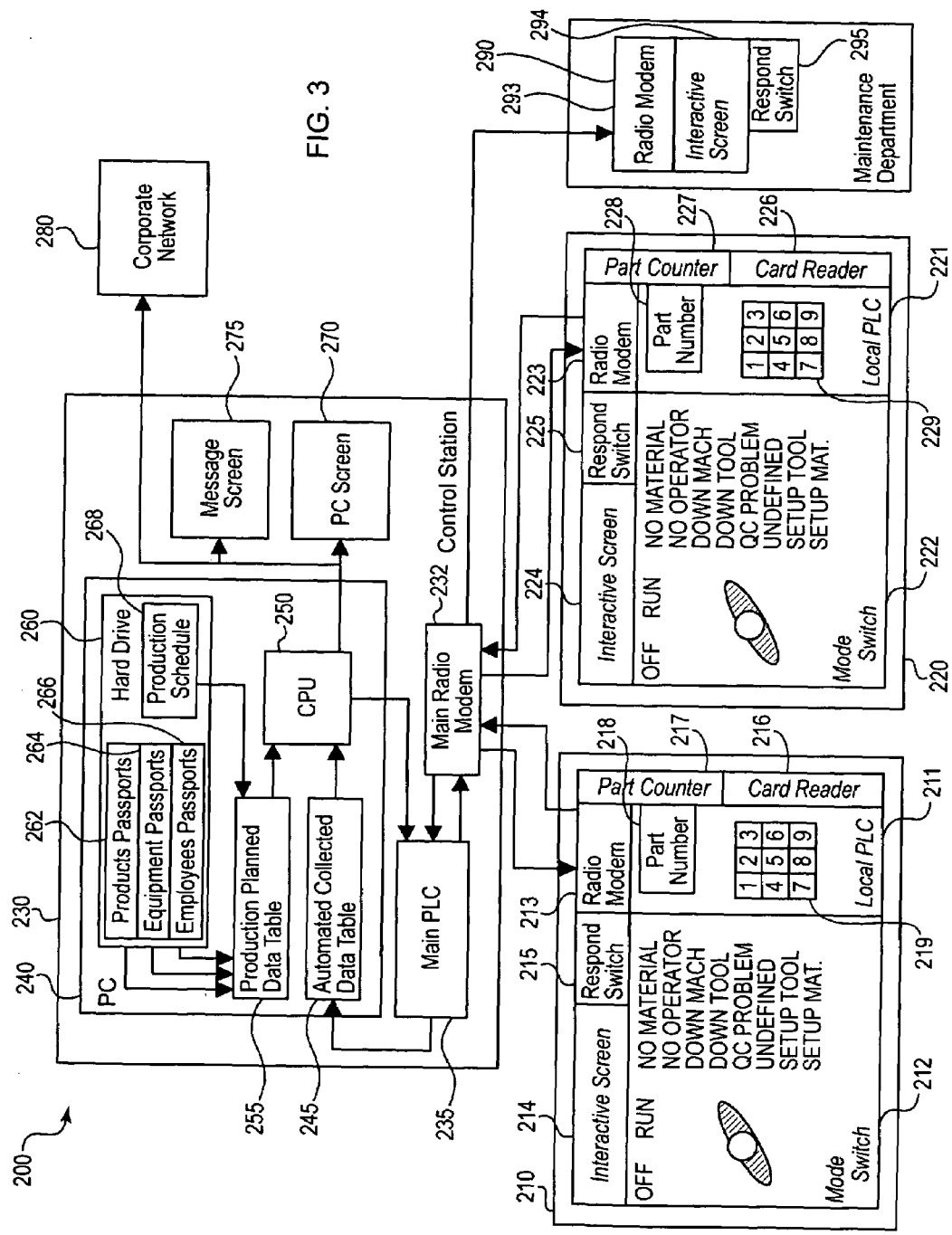
FIG. 3 shows an exemplary system for collecting and analyzing real time data according to the present invention.

FIG. 3 shows an exemplary system 200 for the collection and analyzing of the real time data from the employees and equipment module 125. Exemplary lock following strobing stations (LFSS) 210 and 220 may be included at the various stations (e.g., stations 11–14 of the first press line 10). The LFSS 210 and 220 may transmit and receive data from the control station 230. The LFSS 210 and 220 maybe used on stations where a human operator is operating a piece of equipment. The LFSS 210 includes a local programmable logic controller (PLC) 211, a mode switch 212, a radio modem 213, an interactive screen 214, a respond switch 215, a card reader 216, a part counter 217, a part number display 218 and keypad 219. The LFSS 220 includes similar features 221–229. An employee may insert or slide an employee card in the card reader 216 to indicate the identity of the employee at the work station and record the amount of time that employees spends at the work station. The employee identity and time is an example of real time data that is collected and used to control the manufacturing line. Another example of a card reader 216 may include a bar code scanner for scanning employee IDs.

The employee may also enter data into the LFSS 210 through the keypad 219. This data may include additional information about the employee or about the task that the employee is performing. For example, the employee may have a work order to machine a specified number of parts. The employee may enter the part number that is to be machined which may be shown in the part number display 218. This entering of a part number by the employee may also set up the machine to perform the desired operation on the workpiece. Those of skill in the art will understand that there is a multitude of data that the employee may enter about the employee and/or the task the employee is performing.

The mode switch 212 may be used by the employee to indicate the mode of the equipment. For example, in the run mode, the equipment may be operating and performing the desired task on the workpiece. The off mode indicates that the equipment is not currently operating. As shown in FIG. 3, the employee may indicate the reason that the equipment is in the off mode via the mode switch 212. For example, there may be no material or workpieces available to the equipment, the operator may leave the station, there may be a problem with the equipment, the equipment or material may have to be setup in order to resume operations, etc. Those of skill in the art will understand that the reasons for equipment being in the off mode may be customized for different facilities and/or equipment. Thus, the mode switch 212 of the LFSS 210 may have different settings based on the needs and operations of the facility in which the equipment is located and the operation of the individual piece of equipment.

The interactive screen 214 is used to display information to the employee at the station for various purposes. For example, as described above, the work order module 120 may generate a work order for a particular station. This work order may be electronically signaled to the LFSS 210, as described in greater detail below, and displayed on the interactive screen 214 to instruct the employee as to the tasks or tasks which the employee should be performing. The interactive screen 214 may also display real time data for the employee. For example, the number of units that the employee has produced in a shift, how far ahead or behind schedule the employee is in producing units, etc. Additional examples of data which may be displayed on the interactive screen 214 will be given throughout this description.

The respond switch 215 may be used by the employee to respond to messages or displays on the interactive screen 214. For example, the interactive screen 214 may display a work order change. When the employee read this information on the interactive screen 214, the employee may then activate the respond switch 215 to indicate to the control station 230 that the information has been received and the employee is taking the appropriate steps to implement the revised work order. The employee may use the respond switch 215 to confirm the receipt of any message from the control station 230.

The part counter 217 may be used to collect real time data from the equipment on which the LFSS 210 is located. The real time data may include the number of parts that are produced by the equipment, whether raw materials or workpieces are present at the equipment, whether the operator is present, standard equipment monitoring instruments, etc. Thus, the part counter 217 may be a series of instruments or monitors that collect data from the equipment.

The local PLC 211 may be considered the central receiving station for the information that is collected by the LFSS 210 for transmission to the control station 230 and for the information sent by the control station 230 and displayed on the interactive screen 214. For example, the card reader 216 may collect the information from the employee's identification card and relay this information to the local PLC 211 which may then prepare or relay the information to the control station 230. In the reverse direction, the local PLC 211 may receive information for display from the control station 230 and then relay this information to the interactive screen 214 for actual display on the LFSS 210. The process for transmitting information will be described in greater detail below. Those of skill in the art will understand that the local PLC 211 may be any computing or processing device that is located within the LFSS 210 for the receipt and distribution of information. A PLC may be desirable because they are tested and sufficiently durable for factory floor implementation. In addition, it may be possible for each of the subcomponents of the LFSS (e.g., the card reader 216, the mode switch 212, etc.) to directly communicate with the control station 230.

The data collected at the LFSS 210 to be sent to the control station 230 and the data sent in the reverse direction (e.g., from the control station 230 to the LFSS 210) may be sent via any communication medium for communicating data from one device to another device, e.g., wireless, direct cable or fiber connection, LAN, WAN, Ethernet, etc. The exemplary communication medium shown in FIG. 3 is wireless communication via the radio modem 213 in the LFSS 210. In this exemplary configuration, the local PLC 211 collects the data from the other sub-components of the LFSS 210 (e.g., the card reader 216, the mode switch 212, etc.) and then sends the data to the radio modem 213. The data is then formatted for wireless communication by the radio modem 213 and transmitted to the main radio modem 232 of the control station 230. Similarly, the main radio modem 232 may receive information from the sub-components of the control station 230 and transmit the information to the radio modem 213 of the LFSS 210. In addition, the LFSS 210 and 220 maybe self checking in that they transmit the same data over multiple communication mediums in order to assure that the data transmission is reliable.

Those of skill in the art will understand that the above example of a LFSS is only exemplary and that there are numerous methods of collecting data in a facility. Some of these methods may already exist in the facility such as time clocks for monitoring employees, instrumentation that monitors the flow of material and equipment instrumentation that monitors the operation of the equipment. This type of information that may be currently collected at facilities may be sufficient to implement the present invention. While the data collected by additional data collection devices, e.g., the LFSSs 210 and 220, may add to the detail level of the collected information. Each piece of additional information that is provided to the system may further improve the efficiency of the manufacturing line 1.

The control station 230 includes the main radio modem 232, the main PLC 235, the personal computer (PC) 240, the PC screen 270 and the message screen 275. As described above, the main radio modem 232 may be used for two way communication between the control station 230 and the LFSS 210 and 220. The data received by the main radio modem 232 may then be communicated to the main PLC 235 which may be an existing PLC or a newly added PLC. It is very typical in existing facilities to have a PLC to both send information to and receive information from facility equipment in order to control the equipment and the overall process. The capabilities of a currently installed PLC maybe utilized as the main PLC 235 to decrease the cost of implementing the present invention. Thus, even though the exemplary control station 230 is shown as being contained in a single area as illustrated by the box enclosing the control station 230, the sub-components of the control station 230 (e.g., the main PLC 235, the PC 240, etc.) may be located at various locations throughout the facility.

In addition, the main PLC 235 may already be collecting real time data from the equipment, i.e., information distinct from that collected by the LFSS, which can also be transmitted to the PC 240. Typically, the information collected by a PLC is binary data that may be used to control the equipment such as through the opening and closing of contacts on a graphical ladder diagram that may be programmed into the PLC. Such binary information may include the opening and closing of process parameter switches (e.g., temperature, pressure, level, flow, limit, etc.), electrical and mechanical interlocks, etc. However, there are PLC components or PLC rack components which may also collect analog information such as typical 4–20 mA or 10–50 mA signals from process parameter instruments (e.g., pressure instruments, differential pressure instruments, etc.) or other types of analog inputs (e.g., thermocouple inputs, resistive temperature device (RTD) inputs, etc.). In addition, any other type of input may also be used to collect information on the process, for example, bar code reading or machine vision instrument input. This information may be combined with the real time data collected by the LFSS 210 to give a more detailed description of the current operation of the piece of equipment.

In addition to main PLC 235, the data of the type that is not collected by the LFSS 210 may go directly to the PC 240 through similar communication mediums as described above or through other types of equipment such as relay racks, analog or digital input cards for a digital control system (DCS), multiplexers, etc. As shown in FIG. 3, the main PLC 235 may also relay the information from the PC 240 to the main radio modem 232 for communication from control station 230 to the LFSS 210 and 220.

In the exemplary embodiment of FIG. 3, the real time data collected at the individual stations of the manufacturing line 1 by LFSS 210 and 220 is sent via wireless communication to the main radio modem 232 of control station 230 and is then transmitted to the main PLC 235 which then transmits the information to the automated collected data table 245 of the PC 240. The automated collected data table 245 collects all the real time data from the employees and equipment 125 so that it may be analyzed. Those of skill in the art will understand that the data collected from the employee and equipment module 125 may include other types of data in addition to real time data. For example, there may be a delay on the collection of some data, some equipment may store historical data that is downloaded on a periodic basis, etc. However, the term real time data will be used throughout this description to describe the information that is collected from the employee and equipment module 125 of the manufacturing line 1.

The automated collected data table 245 may be, for example, a data table, array, etc., that stores the real time data as it is received by the PC 240. The automated collected data table 245 may be stored in the temporary memory (e.g., random access memory (RAM)) or permanent memory (e.g., hard drive, CD-ROM, external tape drive, etc) of the PC 240. Those of skill in the art will understand that the PC 240 and the associated equipment (e.g., CPU 250, hard drive 260) and functions (e.g., automated collected data table 245, product passports 262, etc.) described as contained in the PC 240 are only exemplary. The functions performed by the PC 240 may also be performed by other equipment. For example, the real time data may be collected by a facility mainframe computer or other computing equipment for processing. In a further example, the real time data may be collected by a series of PCs located at strategic locations throughout the facility. For example, referring to FIG. 1, each of the individual lines (e.g., first press line 10, first trim line 40, assembly line 50, etc.) may have a control station 230 with a corresponding data collection PC 240 which collects the data to be provided to the automated collected data table 245 and then forwards the information to a facility mainframe for processing. The individual PCs may also do pre-processing on the real time data before it is sent to another location for final processing. The individual PCs may also do all the processing for the real time data for its assigned line and receive other processed information from other networked PCs in order to create the desired output for its individual line.

FIG. 7 shows an exemplary automatic collected data table 245 that may be used to collect the data sent from the LFSS 210 to the control station 230. The current time column 831 records the current time which is the time that the data was collected from the equipment. Thus, when the data is analyzed, the data analyzer will be informed of the exact time that the data was collected. The data analyzer may use this information when formulating the output information based on time. The job order column 832 record the job order (or work order) on which the equipment or employee was currently working. The part ID column 833 records the part number identification on which the equipment was currently working. As described above, an employee may enter the part number via keypad 219 of LFSS 210 which then may be displayed on part number display 218. The operation ID column 834 records the operation identification (e.g., drilling, milling, etc.) that the equipment was performing. The equipment ID column 835 records the equipment identification of the equipment which performed the task for which the data entry is being recorded. The operation identification and the equipment identification will be will be described in greater detail below when the passport information is described.

The operator column 836 includes two entries related to the operator. The first entry is the operator identification and the second entry is the equipment time. As described above, when an employee arrives at a station, the employee may slide or otherwise insert an employee identification card into the card reader 216 of the LFSS 210. This will identify the employee for the first entry of the operator column 836. This sliding of the card may also begin timing how long the employee is at the station. This timing is for the second entry of the operator column 836. The parts produced column 837 indicates the number of parts produced at the station. For example, as described above, part counter 217 may record the number of parts produced and this number may be recorded in the parts produced column 837.

The schedule shift time column 838 records the amount of time on a particular shift that the equipment is scheduled for operation. This number may be generated by the scheduling module 115 based on the scheduled production run of the facility. The production run time column 839 records the amount of time the equipment is actually operated during the shift. For example, this column 839 may record the amount of time the mode switch 212 indicates the equipment is in the run mode to record the actual production time of the equipment. As will be described in greater detail below, the difference between the schedule shift time column 838 and the production run time column 839 may be used to determine the efficiency and productivity of the individual station for which the data is collected.

The downtime column 840 includes six different entries. As described above, when the mode switch 212 of the LFSS 210 is in the off mode, there are methods of determining the reason for the equipment being in the off mode. These methods may be manual or automatic and will be described in greater detail below. However, each of the six entries in the downtime column 840 indicate various reasons for the downtime. The actual data recorded in the various entries of the downtime column 840 may be a time entry to indicate the amount of time the equipment has been in the off mode because of these various problems listed in the entries.

The set-up time column 841 has two entries a first for tool/machine set-up and a second for material set-up. Another reason the mode switch 212 may be in the off mode is because the equipment and/or the material is being set-up for operation. The set-up time column 841 records in the appropriate entry the amount of time it takes to perform these set-up tasks. The preventive maintenance column 842 records the amount of time that preventive maintenance was performed on the equipment.

The dead time column 843 records the amount of time the equipment is operational, but there is no product being manufactured (e.g., the mode switch 212 is in the run mode, but the machine is not producing product). For example, the equipment may be capable of operating and the operator may place the mode switch 212 in the run mode, but then may walk away from the equipment. The time period that the operator is away from the equipment and the equipment is not operating may be classified as dead time due to the lack of production. The dead time column 843 will record the amount of this time.

The dead time may be calculated using a set formula such as $DT=T_{REAL}-(T_{SCHED}+0.1T_{SCHED})$, where DT is dead time, $T_{REAL}$ is the actual time spent to complete one operation, and $T_{SCHED}$ is the predetermined scheduled time to complete one operation. For example, a pressing operation on a part may be scheduled ($T_{SCHED}$) to take four minutes. The actual time it may take to complete the pressing operation ($T_{REAL}$) may be five minutes. According to the above formula, the dead time for this single operation may be DT=5 min−(4 min+0.1(4 min))=0.6 min (36 seconds). Thus, this may signal to facility management that for each pressing operation there is 36 seconds (or 15%) dead time. This dead time may be due to a variety of reasons such as lack of employee diligence, the scheduled time ($T_{SCHED}$) may be too short, etc. However, facility management cannot correct the problem until they are aware of the excessive dead time.

The technician column 844 has two columns similar to the operator column 836. When equipment is down or is scheduled for routine maintenance, a technician may arrive at the station and swipe the employee card through the card reader 216 of the LFSS 210. The first entry of the technician column 844 will record the technician ID as indicated by the employee card. This swiping of the card will also start the time for recording how long the technician if fixing and/or maintaining the equipment. This time will be recorded in the equipment repair time entry of the technician column 844. The technician and the operator may also swipe their employee cards when leaving the station to indicate their shift and/or their task is completed.

Those skilled in the art will understand that the automated collected data table 245 illustrated in FIG. 7 is only exemplary and there may be other manners of storing the collected data. In addition, each entry or column of the exemplary automated collected data table 245 may or may not have an entry. For example, if there is no downtime during a particular shift, the downtime column may be left blank, empty or null for the entire shift. In addition, there may be multiple entries for each equipment or station as the data is collected. However, this may result in a very large table with duplicate information being stored. In the alternative, the previous entries for a station may be overwritten if the collected data remains essentially the same.

For example, the first time the data is collected for a station, it may include the current time 831, the job order 832, the part ID 833, the operation ID 834, the equipment ID 835, the operator information 836, the parts produced 837, the schedule shift time 838 and the production run time 839. During the next data cycle, the same information may be collected, except that there may be a change in the current time 831, the personal equipment time of the operator information 836, the parts produced 837 and the production run time 839. Thus, instead of making a new entry, these columns of the previous data entry may be overwritten with the new information in order to reduce the quantity of stored information. There may also be instances where the full set of collected data may be stored because it reveals additional information about the process. The use of the automated collected data will be described in greater detail below.

The PC 240 also contains a hard drive 260 which stores the product passports 262, equipment passports 264, employee passports 266 and production schedule 268. The information contained in the passports 262–266 is described in greater detail below. As described above, the information stored in and the functions performed by the PC 240 may be accomplished in various manners and the PC format is only exemplary. Using the information from each of the passports 262–266 and the production schedule 268 a production planned data table 255 may be produced. The production schedule data 268 may be the scheduling data generated by scheduling module 115 (FIG. 2) using the feedback of the LTFC module 175 and the STFC module 160 or may be an static production schedule based on parameters defined by facility management. For example, the production schedule 268 may be the schedule 350 shown in FIG. 12 which is generated by the scheduling module 115 for a particular week of production at the manufacturing line 1. The production planned data table 255 contains the expected parameters for the production according to the production schedule 268 including the parameters defined in the passports 262–266. The production planned data table 255 may be stored on the PC 240 in the same manners as described for the automated collected data table 245.

The PC 240 also contains central processing unit (CPU) 250 which may be considered the data analyzer module 135 (FIG. 2). The CPU 250 receives the real time data from the automated collected data table 245 and the static facility parameters from production planned data table 255 and analyzes the data from both sources. The CPU 250 may then generate output data based on these inputs to, for example, a PC screen 270, a message screen 275, a corporate network 280 and the main PLC 235. The type of data that is generated by the CPU 250 will be described in greater detail below. This generated data (the automated tracking data 140 as shown in FIG. 2) may be viewed at the control station 230 via the PC screen 270, the message screen 275 or at any remote station via the corporate network 280 connection. Similarly, the automated tracking data 140 may also be printed via an attached or network printer (not shown). The corporate network 280 connection allows the automated tracking data 140 to be viewed at any location throughout the world. For example, the headquarters for a company may be in the United States, but the manufacturing facilities may be in the Far East. A user at corporate headquarters via, for example, a company intranet or a secure internet connection, may view the automated tracking data 140 for the facilities in the Far East in real time. The output from the CPU 250 to the main PLC 235 may then be relayed via the main radio modem 232 to the LFSS 210 and 220 for display on the interactive screens 214 and 224.

In addition, the maintenance department may contain a maintenance strobing station (MSS) 290 having a radio modem 291, an interactive screen 294 and a respond switch 295. Similar to the radio modem 213 in the LPSS 210, the radio modem 293 of the MSS 290 is used for communicating in both directions with the main radio modem 232 of the control station 230. The interactive screen 294 may also display messages and data that is generated by CPU 250. The respond switch 295 is for the maintenance personnel to respond to the control station 230 based on the messages received on the interactive screen 294. Exemplary data that may be viewed at the maintenance department may include equipment tracking information to determine if any of the equipment is down and needs to be repaired or if equipment is not scheduled for use so that preventive maintenance may be performed without interfering with actual production. The equipment tracking data will be described in greater detail below. If a piece of equipment goes down and is need of repair, the control station 230 may generate a message that is displayed on the interactive screen 294. When an employee of the maintenance department views the message, they may activate the respond switch 295 to indicate that the message was received and the appropriate repair action will be initiated.

Figure 4:
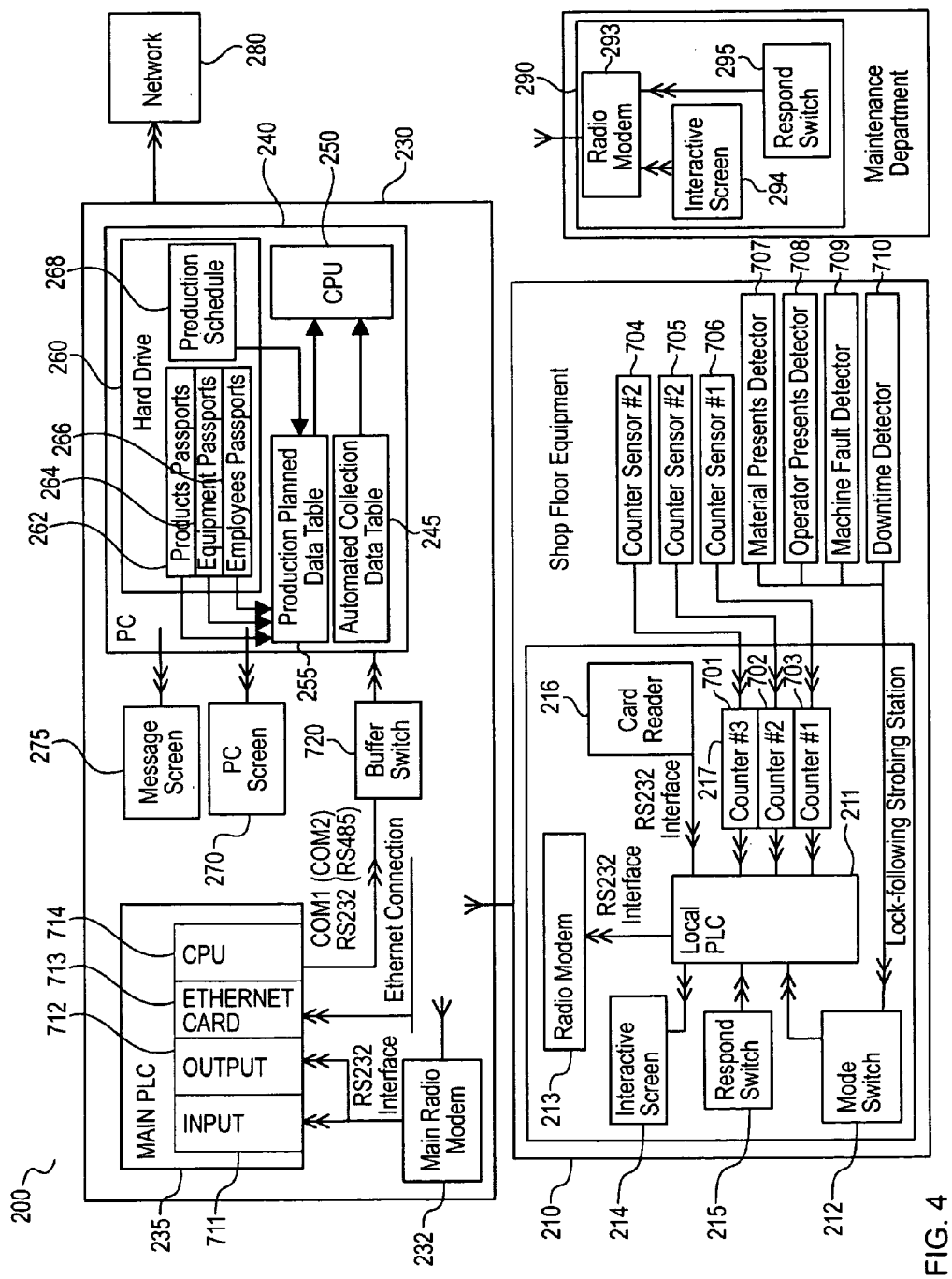
FIG. 4 shows exemplary communications connections for a system collecting and analyzing data according to the present invention.

FIG. 4 shows exemplary communications connections for the system 200 collecting and analyzing data. The components in FIG. 4 are similar to those shown in FIG. 3 with additional detail on some components. The LFSS 210 is shown with the interactive screen 214, the respond switch 215, the mode switch 212, the card reader 216, the part counter 217 and the local PLC 211. As described above, the sub-components which collect real time data (e.g., the card reader 216, the respond switch 215, the mode switch 212 and the part counter 217) send the data to the local PLC 211. The communication between these components and the local PLC 211 may be via any communication medium supported by the local PLC 211 (e.g., RS-232, Ethernet, digital inputs, analog inputs, Universal Serial Bus (USB), etc.). For example, the bar code reader 216 is shown as being connected via an RS-232 interface. Similarly, the interactive screen 214 which receives information from the local PLC 211 to display and the radio modem 213 which supports two way communications with the local PLC 211 may be connected via any supported communications medium.

As described above, the part counter 217 may be a series of monitoring equipment that monitors the equipment to which LFSS 210 is attached. In this example, part counter 217 contains three input counters 701–703 which receive data from three sensors 704–706 which may monitor the number of units produced by the equipment. One method of collecting data may include the use of independently verified information by collecting data on the same process from independent sources, e.g., two or more instruments measuring the same process. For example, a facility may employ two or more thermocouples to measure the temperature of a piece of equipment. Similarly, a facility may use a thermocouple and an RTD to measure the temperature of a piece of equipment. These are examples of where the same parameter is measured directly by independent sources. There may also be cases where multiple instruments indirectly record a parameter for independent verification. For example, the first sensor 704 may be a signal generated by the equipment indicating the number of parts that it has processed. This information may be independently verified by the second sensor 705 which may be, for example, a machine vision instrument that counts the number of units leaving the equipment. The third sensor 706 may be another optical instrument which counts the parts as they leave the equipment. Thus, the data from one instrument (or source) is independently verified by data from one or more other instruments.

Additional sensors 707–710 may monitor the equipment. In this example, the sensor 707 may monitor whether material is present, the sensor 708 may monitor whether an operator is present, the sensor 709 may detect equipment faults and the sensor 710 may detect downtime for the equipment. Those skilled in the art will understand that the described sensors are only exemplary and that there may be many types of sensors based on the process and the equipment. In this example, the sensors 707–710 input signals to the mode switch 212. This demonstrates that the mode switch 212 may be a combination of manual and automatic data collection. For example, referring to FIG. 3, the mode switch 212 may have a knob or handle which the operator places in a desired position, thus relaying information to control station 230. This is an example of manual data collection indicating equipment status through operator intervention. Referring back to FIG. 4, the input of the sensors 707–710 to the mode switch 212 indicating equipment downtime and the reason for the downtime is an example of automatic data collection indicating equipment status. The input of the sensors 707–710 may be directed from the mode switch 212 to the local PLC 211 for relay to the control station 230. The input of the sensors 707–710 may also go directly to the local PLC 211 or through the part counter 217. Additional examples of sensors that may be used to monitor equipment may be temperature sensors, limit switches, torque switches, electricity sensors, etc.

Those skilled in the art will understand that it is possible for a single LFSS to monitor multiple pieces of equipment. For example, the LFSS 210 may receive sensor signals from multiple pieces of shop floor equipment. The counter sensors 704 and 705 may be for a first piece of equipment and the counter sensor 706 may be for a second piece of equipment. The part counter 217 may be programmed to determine which sensor is monitoring which piece of equipment so that it may transmit the data for each piece of equipment back to the control station 230. For example, each part counter 217 may have multiple input ports. The ports may be preaddressed for a particular machine or equipment identification so that the sensor inputs into that port are identified as being related to the particular machine or equipment identification. Similarly, the sensors 707–710 may be divided among multiple pieces of equipment and the mode switch 212 may discriminate between the signals form the different sensors 707–710 to determine from which piece of equipment the signal was sent. This information may then be transmitted back to the control station 230.

As previously described, the data from the LFSS 210 may be transmitted via radio modem 213 to the main radio modem 232 which transmits the data to the main PLC 235 via the PLC input 711. Similarly, the main radio modem 232 may receive data from the PLC output 712 that is to be sent to the LFSS 210. In this example, the PLC input 711 and PLC output 712 communicate with the main radio modem using an RS-232 interface. Once again, the communication may be via any supported communication protocol. An example of a PLC input 711 and PLC output 712 is an input and/or output card which is inserted into a rack or slot within a PLC housing. The input and/or output cards (e.g., the PLC input 711 and PLC output 712) communicate with the PLC CPU 714 via a backplane into which each of the components is inserted. Those of skill in the art will understand that there are a variety of communication methods used to communicate between various PLC devices (e.g., PLC input 711, PLC output 712, PLC Ethernet card 713, PLC CPU 714) including open protocols and PLC vendor proprietary protocols.

The main PLC 235 may also include an Ethernet card 713 that is connected via an Ethernet connection to other devices throughout the facility. These device may include other PLCs, PCs, control stations, instruments or instrument racks, communications systems, facility control computers, etc. Such a connection allows this main PLC 235 to communicate directly with other devices throughout the facility. The Ethernet card 713 may communicate with the other components of the main PLC 235 via the backplane as described above.

The PLC CPU 714 is the main processing component of the main PLC 235. Ths PLC CPU 235 generally contains the programming and instruction for the main PLC 235 to execute the intended function. For example, one of the intended functions for main PLC 235 may be to forward the data collected from the LFSS 210 to the control station 230. In this example, the PLC CPU 714 forwards the collected data to a buffer switch 720 via its COM1 port on an RS-232 interface or via its COM2 port on an RS-485 interface. Using the COM1 and COM2 ports of the PLC CPU 714 is only exemplary and other communication methods may be used (e.g., serial ports, Ethernet connections, etc.).

The buffer switch 720 then communicates the data to the automated collected data table 245 of the PC 240 in the control station 230. The buffer switch 720 may be used where there are multiple PLCs sending data to the PC 240 in order to control the flow of data to the PC 240 for orderly processing. The additional components of the control station 230 were previously described above and the connection between these components may be made using any supported communication link. Similarly, the connections between the components in the MSS 290 may be made in any of the manners described above for the LFSS 210.

Figure 5:
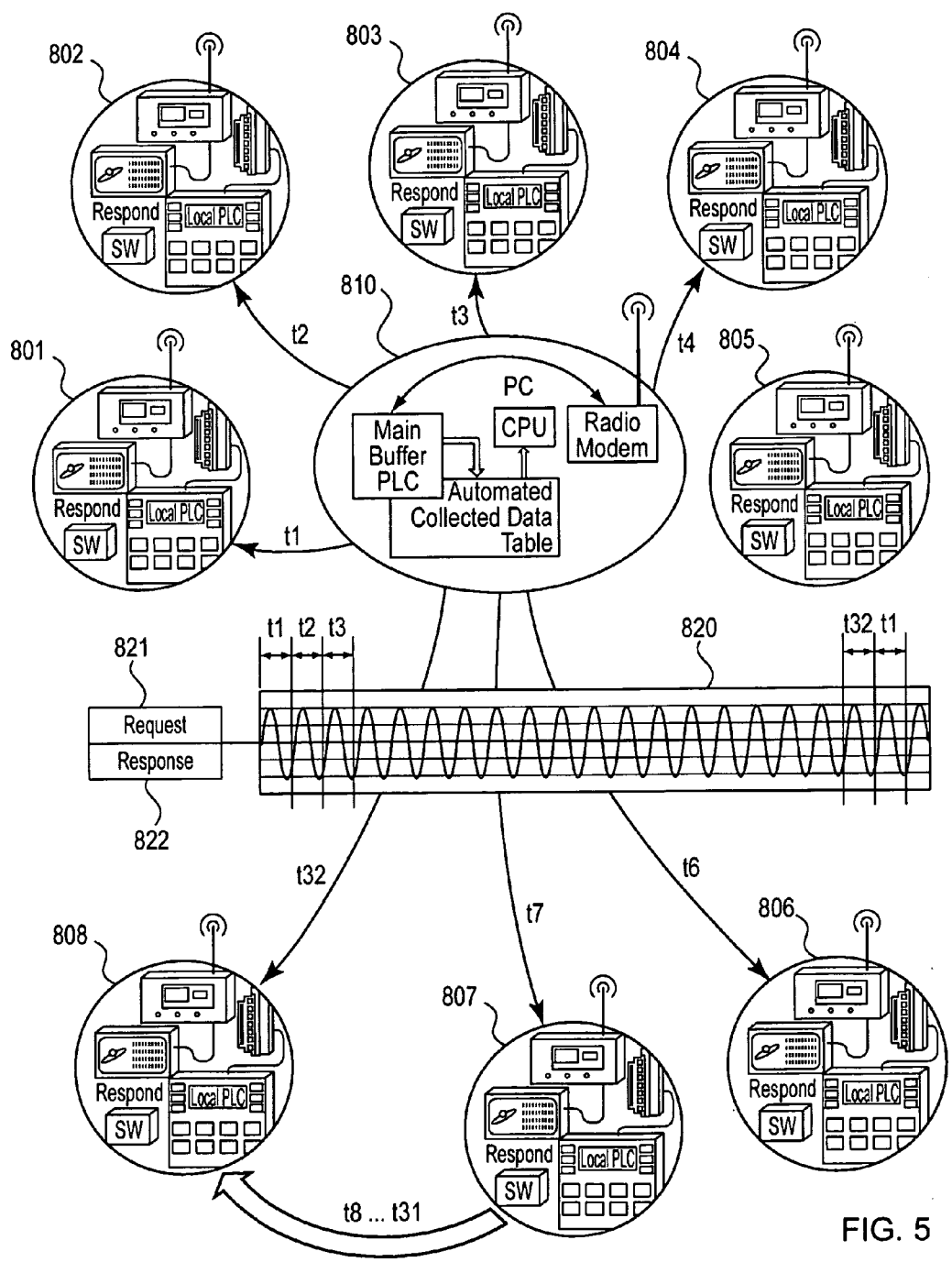
FIG. 5 shows a series of exemplary data collection units communicating with an exemplary control station according to the present invention.

FIG. 5 shows a series of exemplary data collection units 801–808 (e.g., Lock-following Strobing Stations) communicating with an exemplary control station 810. It may be considered that each of the data collection units 801–808 may contain some or all of the components described for the LFSS 210 in FIGS. 3 and 4 or it may be some other type of data collection unit collecting data at the facility. Similarly, the control station 810 may contain some or all of the components described for the control station 230 in FIGS. 3 and 4. In this example, each of the data collection units 801–808 is transmitting and receiving information via a radio modem connection with the control station 810. Those of skill in the art will understand that the described communication scheme may be applicable to any type of connection between the data collection units 801–808 and the control station 810.

In this example, each of the data collection units 801–808 is allocated a specific time period to communicate with the control station 810. For example, the data collection unit 801 is allocated time period $t_1$, the data collection unit 802 is allocated time period $t_2$, and so on through the data collection 808 which is allocated time period $t_{32}$. Each of the timer periods (e.g., $t_1, \ldots t_{32}$) may be the same length or amount of time, but they are offset in time so that no one period overlaps another period. As shown by the request-response graph 820, the time period $t_1$ for the data collection unit 801 to communicate with the control station 810 is first, the time period $t_2$ for the data collection unit 802 to communicate with the control station 810 is second, and so on through the final data collection unit 808. In this example, the total time for each of the time periods (e.g., $t_1 \ldots t_{32}$) is 60 seconds. However, those skilled in the art will understand that any length of time may be selected based on the needs of the facility, the communication system, the control station and the data collection unit.

As shown in graph 820, each of the time periods (e.g., $t_1 \ldots t_{32}$) is separated into a request period 821 and response period 822. During the request period 821, the control station 810 communicates with the individual data collection unit to relay any data from the control station 810 to the individual data collection unit. Included in this relay may be a signal to the individual data collection unit that the control station 810 is ready to accept information from the data collection unit. The data collection unit then transmits its data to the control station during the response period 822.

Figure 6:
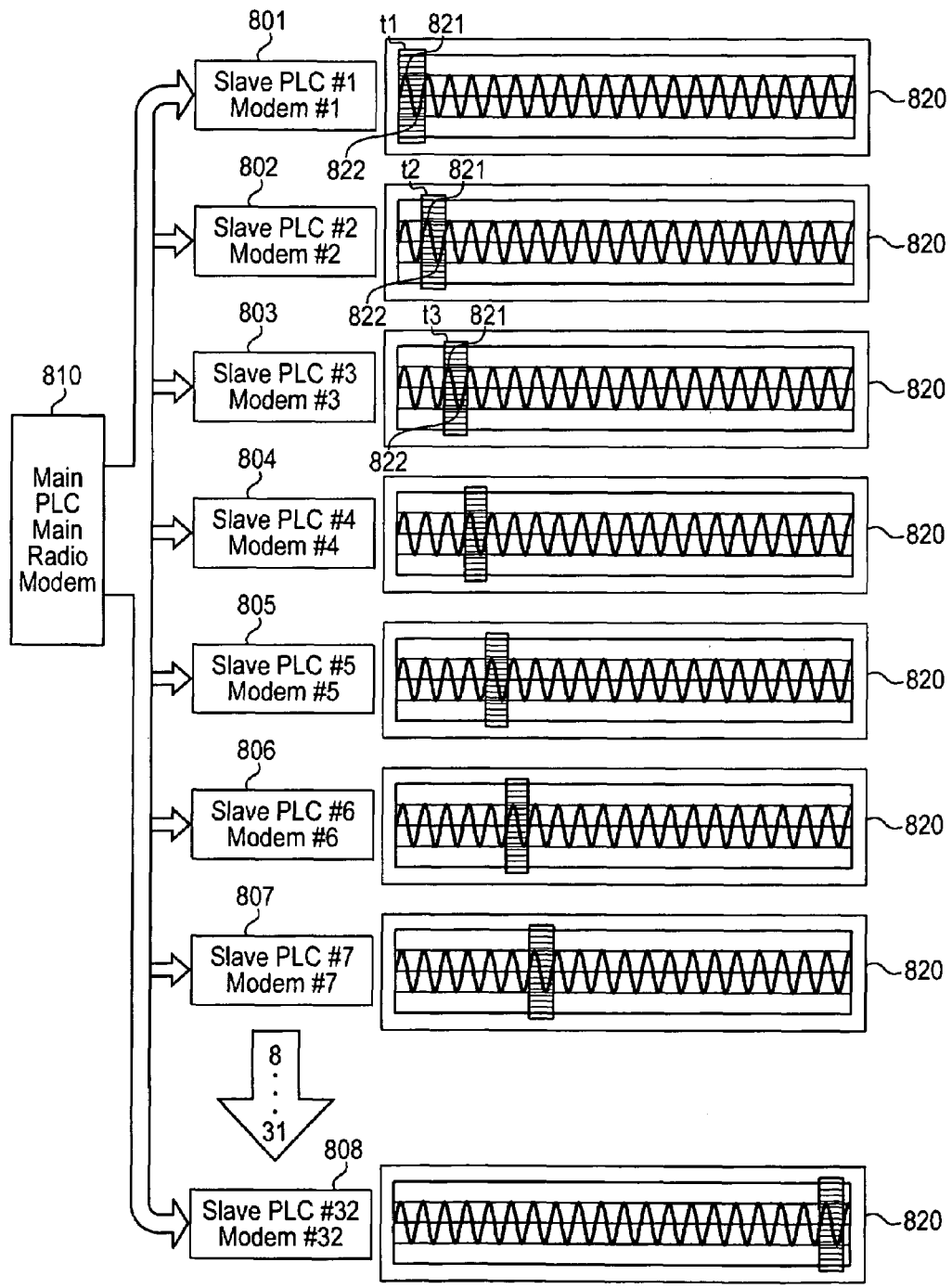
FIG. 6 shows an exemplary request-response graph for a series of exemplary data collection units communicating with an exemplary control station according to the present invention.

Referring to FIG. 6, the request response graph 820 is shown in more detail. In this example, the control station 810 shows a main PLC and a main radio modem for communicating with each of the data collection units 801–808 shown as a slave PLC and a slave radio modem. The time allocated for data collection unit 801 to communicate with the control station 810 is time period $t_1$. During the request period 821 of time period $t_1$, the control station 810 may send a communication to the data collection unit 801 which may include data bound for data collection unit 801 (e.g., a message to be displayed on an interactive screen) and a signal that data collection unit 801 may transmit its collected data back to the control station 810. When the request period 821 expires and the response period 822 of time period $t_1$ begins, the data collection unit 801 transmits the collected data to the control station 810.

During the response period 821, the data collection unit 801 may broadcast the data to be transferred multiple times. The main PLC of the control station 810 may then compare each of the sets of data transferred and then further transmit to the other parts of the control station 810, the most intact set of data. For example, the data collection unit 801 may have 200 bytes of information to broadcast to the control station. During its response period 821, the data collection unit may broadcast this 200 bytes of data three (3) separate times. Thus, the control station 810 via its main radio modem will receive three sets of data from the data collection unit. The main PLC of the control station 810 may then compare the three sets of received data and send the set with the most integrity to other portions of the control station 810 for further processing. Those of skill in the art will understand that there are a number of integrity checking methods, for example, check sums, hash tables, etc.

When the response period 822 of time period $t_1$ expires, the request period 822 of time period $t_2$ begins. During this request period the control station 810 may send a communication to the data collection unit 802 which may include data and a signal that data collection unit 802 may transmit its collected data back to the control station 810. During the response period 822 of time period $t_2$, the data collection unit 802 transmits the collected data to the control station 810.

This process continues until all of the data collection units 801–808 have completed a request period 821 and response period 822. The process then begins again for the first data collection unit 801. In this manner, the control station 810 communicates with each of the data collection units 801–808 for which it is responsible in an orderly and regular manner. This also assures the overall system that the collected data is real time data because it is collected at the data collection units 801–808 and sent to the control station 810 in a timely fashion. Those of skill in the art will understand that the time periods may be variable or rearranged based on the current needs of the facility. For example, data collection unit 801 may indicate to control station 810 that there is a failure at the station and as a result of the failure there has been more data than usual collected. Thus, data collection unit 801 may indicate that it needs the response period 822 lengthened so that it may transmit all the data to the control station 810.

Similarly, data collection unit 801 may detect the same failure during the communication time period of another data collection unit (e.g., data collection unit 804). There may be a program or protocol in place where the data collection unit 801 may interrupt the communication of the other data collection unit because it has been predetermined that the control station 810 needs to know immediately about certain types of failures or other events.

When selecting the communication time period, the system designer may take into account various factors including the amount of data normally collected within each time cycle, the criticality of the collected data, the amount of data collected during certain failure conditions, etc. The system designer then may account for the overall system needs when selecting the communication time period. For example, the collected data during normal operation may be transmitted (x) times (e.g., 3, 4, 5, etc.) during a response period 822 having a duration of $t_1$. Whereas, in a typical failure condition, the amount of data collected and transmitted (x) times may require a response period 822 having a longer duration $t_2$. Finally, in a catastrophic failure condition the amount of data collected and transmitted (x) times may require a response period 822 having an even longer duration $t_3$. In this scenario, a system designer may determine that a communication period having a response period 822 of duration $t_2$ is the optimum period because it allows data to be collected during normal operations without a significant lag period and it picks up the most typical failure conditions. A response period 822 of duration $t_3$ may be determined to be too long because the real time data collected during normal operation may become stale waiting for the next processing cycle. However, in another system, the designer may select a response period 822 of duration $t_3$ because it is important to see all the data for all failure modes. While in still another system, the designer may select a response period 822 of duration $t_1$ because the normal operating mode is the most important and it is not as important to see all the data associated with failure modes. The processing rates of current PLCs may support extremely fast request and response periods in the milli-second (msec) range. Thus, a single time period may be, for example, 150 msec.

Referring back to FIG. 2, in addition to the real time data that is collected by the ADC module 130, other information may be maintained by the system 100 in the form of a facility permanent database module 145. This more permanent information may include product passports, equipment passports and employee passports. The passport information may be provided by the facility management as essential data about different aspects of the facility. The use of this passport information will be described in greater detail below.

FIG. 8 shows an exemplary graphical user interface (GUI) screen 300 for displaying and/or entering employee passport information. The GUI screen 300 shows a series of employees 301–304 and retained information about each employee, for example, employee identification number, name, division, position, hourly rate, hire data and seniority level. Those skilled in the art will understand that the displayed information is only exemplary and that each employer may select the type of information that is displayed for the employees. As shown in FIG. 8, the employee 303 (Jim Eagle) may be highlighted to retrieve additional information concerning this employee in the lower portion of the GUI screen 300. The control bar 310 at the top of the GUI screen 300 allows an operator to select how the information will be displayed or make changes to the information. For example, the operator may select to display all the employees for a particular plant, display all employees in an alphabetical format, or sort the employees based on some criteria (e.g., seniority, pay rate, etc.). The operator may also edit a record for the employee, i.e., change the information for an employee such as pay rate, create a new employee, or delete an employee.

Figure 9:
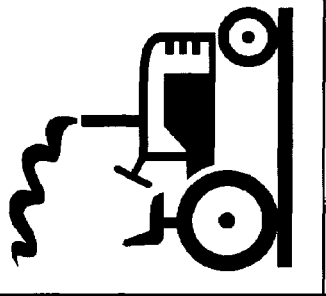
FIG. 9 shows an exemplary graphical user interface screen for displaying equipment passport information according to the present invention.

FIG. 9 shows an exemplary GUI screen 320 for displaying and/or entering equipment passport information similar to the GUI screen 300 for the employee passport information. The GUI screen 300 shows a series of equipment 321–324 and retained information about this equipment, for example, equipment ID number, name, division, the type of operation, the time availability, depreciation of the equipment, the install date, the equipment complexity and where the equipment is located. As shown in FIG. 9, the equipment 323 (CNC Mill #6) may be highlighted and additional information concerning this equipment is displayed in the lower portion of the GUI screen 320. The control bar 310 at the top of the GUI screen 320 allows an operator to select how the information will be displayed or make changes to the information in the same manner as described above for the GUI screen 300.

Figure 10:
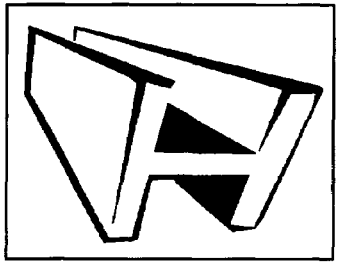
FIG. 10 shows an exemplary graphical user interface screen for displaying product passport information according to the present invention.

FIG. 10 shows an exemplary GUI screen 330 for displaying and/or entering product passport information similar to the GUI screen 300 for the employee passport information. The GUI screen 330 shows a series of products 331–334 and retained information about these products, for example, product ID number, name, part number, the manufacturing division, the number of operations to manufacture the product, production time, labor cost and the assembly number. As shown in FIG. 10, the product 333 (Arm) may be highlighted and additional information concerning this product is displayed in the lower portion of the GUI screen 330. The control bar 310 at the top of the GUI screen 330 allows an operator to select how the information will be displayed or make changes to the information in the same manner as described above for the GUI screen 300.

Figure 11:
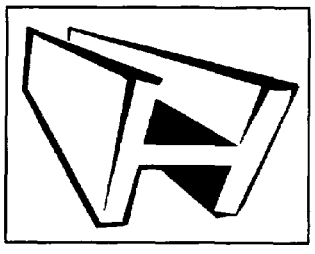
FIG. 11 shows an exemplary graphical user interface screen for displaying product operation passport information according to the present invention.

FIG. 11 shows an exemplary GUI screen 340 for displaying and/or entering product operation passport information similar to the GUI screen 300 for the employee passport information. The product operation passport information displayed by the GUI screen 340 in FIG. 11 differs from the product passport information displayed by the GUI screen 330 in FIG. 10 in that the operation information concerns the individual operations that need to be carried out to produce the product described in the GUI screen 330. For example, the product operation information displayed on the GUI screen 340 is for the product 333 (Arm) displayed by the GUI screen 330 in FIG. 10. As shown in FIG. 10, arm 333 requires four operations to manufacture. The GUI screen 340 displays these four operations 341–344 and the details about these operations, for example, operation ID number, name, the operation sequence, the division performing the operation, the equipment performing the operation, production time, labor cost and the post number.

As shown in FIG. 11, the operation 343 (Drilling) may be highlighted and additional information concerning this operation is displayed in the lower portion of the GUI screen 340. The control bar 310 at the top of the GUI screen 340 allows an operator to select how the information will be displayed or make changes to the information in the same manner as described above for the GUI screen 300. Those skilled in the art will understand that the information described for each of the passports is only exemplary and that an individual facility may define the type of information used and/or displayed for that facility. In addition, the exemplary information is for a traditional milling and machining type manufacturing process. The information may be different for other types of manufacturing processes or other non-manufacturing processes to which the present invention may be applied.

The passport information described with reference to FPD module 145 is relatively static information about the facility that may be used in conjunction with the real time data. For example, the real time data collected by the LFSS 210 (FIG. 3) may indicate that the employee 301 (FIG. 8) is manning a particular station. This is real time data because it reflects the current state of the facility. However, the base information concerning the employee 301 (e.g., pay rate, position, etc.) is relatively static. The information may change such as when the employee receives a pay increase, but the changes will be less frequent than the real time data. Similarly, for the other types of passport information, the equipment, products and product operations will remain relatively static over time. Thus, it is appropriate to store this information on a more permanent basis. Throughout this description the term static will be used to describe the data or information stored in the passports or the scheduling data. Those of skill in the art will understand that the described data may not actually be static because it may change, but the term will be used to distinguish between data that is entered into the system (e.g., passport information), generated by the system (e.g., scheduling data) and the real time data which is collected by the system.

The above described data passport information may be relational, i.e., when the data changes for one passport, it may effect an automatic change in another passport. For example, if an employee receives a pay increase and the pay rate data is changed for that employee, there may be a change (increase) in the labor cost to the products on which the employee is working. The operator may not need to go into the product passport to make this change because the change in the pay rate for the employee may trigger an automatic recalculation of other passports that use this information.

The passport information may reflect the preferred scenario for facility production based on a set of parameters defined by the facility management. For example, the product passport 331 (Piston) of FIG. 10 shows that there are five operations to produce one of the pistons 331 with an ideal production time of 120 minutes and a labor cost of $9.20. However, this preferred scenario assumes certain pre-conditions for the ideal production time and cost. For example, it assumes that the stations for each of the operations are manned, that the raw material or workpieces are available, that the equipment is up and running, etc. If any of the pre-conditions are not satisfied, the actual operating experience may not match the preferred scenario predicted by the passport information.

Referring to FIG. 2, the system 100 contains the real time data collected by the ADC module 130 and the facility static data entered into the facility permanent database module 145. This data may then be analyzed by the data analyzer module 135 to compare the actual facility operating experience (real time data) to the static facility parameters (passport data). This information may then be used by facility management for a variety of ends, including changes to the production schedule, improved efficiency, determining employee productivity, etc. Exemplary ends will be described in greater detail below. Those of skill in the art will understand that the data analyzer module 135 may also analyze the real time data for the same ends without comparing it to the static facility parameters. For example, the real time data may show that a particular employee was not at the assigned station for a significant portion of the shift. In this case, the data analyzer module 135 may not need to compare the real time data to the static data in order to inform facility management of this anomaly because the analysis of the real time data is sufficient.

The output of the data analyzer module 135 is the automated tracking data 140 which is the information that the facility management may use to better control production at the manufacturing line 1. The following is a series of examples of automated tracking data 140 that may be generated by the data analyzer module 135. The figures associated with the various types of automated tracking data 140 generally show GUI screens that may be used to display the data. Those of skill in the art will understand that the GUI screens are only exemplary and the data may be formatted in numerous manners for display. In addition, the data may also be displayed or signaled in other manners such as alarms or printed reports. The data may also be used for control purposes, i.e., the data output is a signal that either directly or indirectly controls a process, sub-process or equipment. Some examples of using the automated tracking data 140 for control will be described below. However, once again, these are only exemplary and there may be numerous other control uses for the automated tracking data. It should also be noted that the lines and equipment referred to in the exemplary GUIs does not correspond to the lines or stations described with reference to FIG. 1.

Figure 13A:
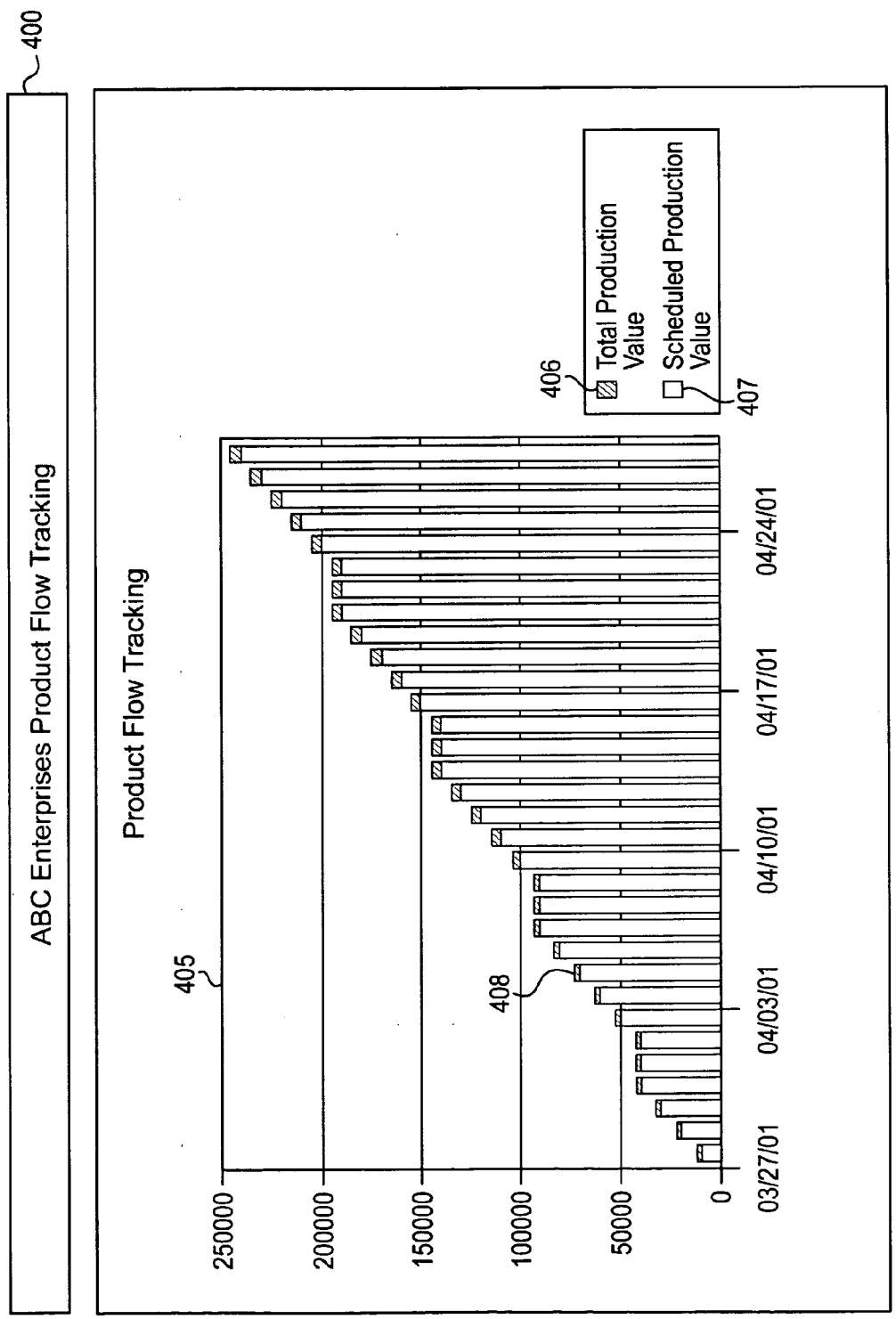

FIGS. 13a–b show examples of product flow tracking information that may be generated by the data analyzer module 135. FIG. 13a shows a product flow tracking GUI screen 400 having a tracking graph 405 which tracks the number of units produced and the scheduled number of units (y axis) against the date or number of days of production. In the example of tracking graph 405, the cumulative number of units produced is shown on a daily basis. Thus, on the starting date of Mar. 27, 2001, the number of units shown on the graph 405 is the number produced on that day. While on subsequent days, the number of units shown is the number of units produced on that day plus all of the previous days from the start date. The tracking graph 405 may be compiled using real time data and/or static data. For example, the total production value 406 shows the number of actual units produced as indicated by the real time data for the facility as indicated in automated collected data table 245. As described above, there are numerous manners by which the real time data for the actual produced number of units may be collected by the ADC module 130. For example, when the units are packaged, an employee may scan a bar code on the final packaging indicating that the unit is completed. This real time bar code scanning data may be collected by the ADC module 130 and used to produce automated tracking data 140. The scheduled production value 407 shows the number of units that were scheduled to be produced for a particular time period as indicated by production planned data table 255. This scheduled data may be from a schedule generated by scheduling module 115.

The exemplary scheduled production value 407 at the end of the first week of production (shown as the day 408 on the tracking graph 405) is 50,000 units. The actual production value 406 at the end of the day 408 is less than the 50,000 unit target. Thus, tracking graph 405 indicates to the facility management that the actual production levels are less than the scheduled production levels. Facility management may then use this information and other automated tracking data 140 to determine the cause of the actual production being lower than planned or scheduled production. Those of skill in the art will understand that this product flow tracking data is only exemplary and that there may be other types of product flow data that may be output by the data analyzer 135. For example, a tracking graph may track the product flow out of an individual station or line and compare it to the scheduled production from that station or line. In a further example, the tracking graph may be on a shorter or longer duration such as hourly or weekly. A facility production manager may desire to see the data on an hourly or even shorter duration because this individual is directly responsible for meeting production schedules. Whereas, a salesman responsible for the order may only be interested in seeing the tracking data on a weekly basis to have a general idea as to whether the overall production schedule will be satisfied. The product flow tracking data may also indicate the current real time number of parts produced at any point within a shift for that shift or for the overall project, the percent complete of the project, the status of product flow at individual stations or operations and the estimated completion dates for each operation and/or the entire project. As described above, this real time data is collected from the facility floor using various instruments at the work stations.

FIG. 13b is another example of a product flow tracking GUI screen 410 having a tracking table 415 which tracks the number of units produced and the scheduled number of units to be produced. For example, column 414 shows the day and date, column 415 shows the number of actual units produced for the corresponding day, column 416 shows the total number of units produced through the corresponding day, column 417 shows the number of scheduled production units through the corresponding day and column 418 shows the percent of units actually manufactured against the scheduled production. For example, through Apr. 16, 2001 there are 145,210 units actually produced based on the real time data into the system. The scheduled number of units through that date is 150,000 units based on, for example, a schedule from scheduling module 115. Thus, 97% of the scheduled units through that date have been actually produced at the manufacturing line 1.

As shown in FIG. 2, the automated tracking data 140 may be output to various locations such as the AEC module 150 which feeds the information back to the equipment and employees module 125. Referring to FIG. 3, the automated tracking data 140 may be output by the CPU 250 to the main PLC 235 which then may distribute the data to various locations including the interactive screens 214 and 224 of LFSS 210 and 220, respectively. In this example, each of LFSS 210 and 220 may be associated with a specific piece of facility equipment. The CPU 250 may accept data from the LFSS 210 and 220 and/or other monitoring equipment about the facility equipment and produce, for example, the product tracking data described above. Operators at the stations may monitor this product tracking data by viewing the interactive screens 214 and 224. For example, the facility equipment associated with LFSS 210 may be scheduled to produce 1,000 units during the current shift. The CPU 250, via main PLC 235 and radio modem 232, may relay this scheduled information to the interactive screen 214.

Similarly, the real time data of the number of actual units produced during the current shift including a percentage of underproduction or overproduction may be relayed. For example, the real time data may indicate that the operator has produced 525 units through the first four hours of an eight hour shift. Thus, interactive screen 214 may display to the operator that the production is 5% ahead of schedule for the current shift. Other types of automated tracking data 140 or other information may also be displayed on interactive screens 214 and 224 and product flow tracking is only exemplary. For example, the interactive screen 214 may display work order information generated by the work order module 120 so that the employee operating the equipment is aware of the work orders for the station.

Figure 14:
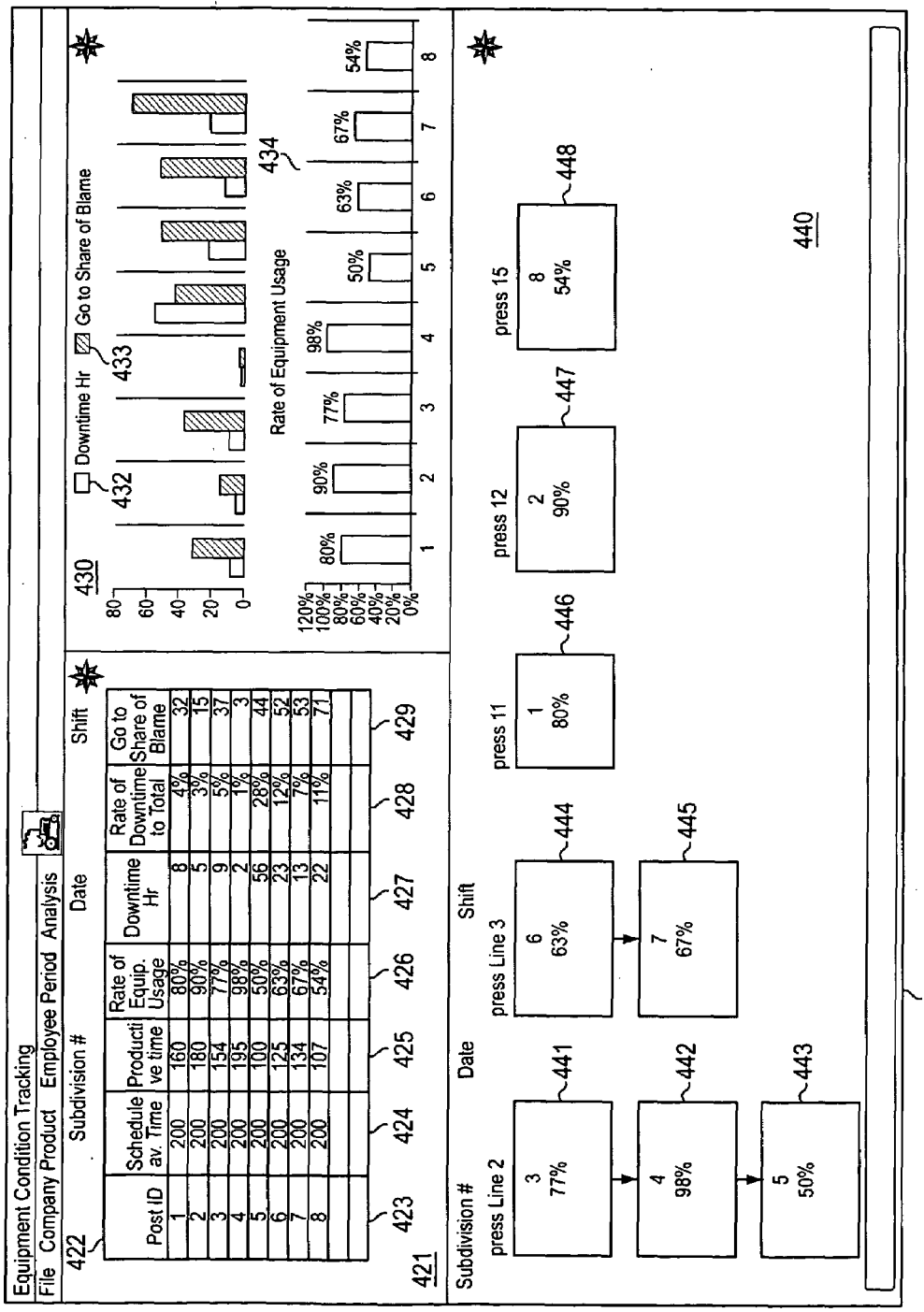
FIG. 14 shows an exemplary graphical user interfaces displaying equipment condition tracking information according to the present invention.

FIG. 14 shows an exemplary graphical user interface 420 displaying equipment condition tracking information which is another exemplary form of automated tracking data 140. The equipment tracking information includes real time data on each piece of monitored equipment, real time production efficiency, equipment utilization reports, machine time calculations, etc. For example, the real time data collected by the LFSS 210 for its associated equipment may indicate to the production manager whether the equipment is currently operating or if it is off-line and the reason for it being off-line. The GUI screen 420 includes a first portion 421 which has a table 422 showing various equipment tracking information. The first column 423 indicates the equipment identification, column 424 indicates the amount of time the equipment was scheduled to operate, column 425 indicates the actual productive time, column 426 indicates the percentage of equipment usage, column 427 indicates the downtime, column 428 indicates the downtime rate and column 429 indicates the share of blame for the equipment.

To provide a specific example, the equipment identified as Post ID 1 in the column 423 of the table 422 was scheduled to have an operating time of 200 hours based on, for example, a schedule produced by the scheduling module 115. Thus, the data for this column 424 may be obtained from the production planned data table 255. The real tine data collected from, for example, the LFSS 210 shows that the time the machine was operating was 160 hours as shown in the column 425. Thus, the data for this column 425 may be obtained from the automated collected data table 245, for example, from production run time column 839 of FIG. 7. The data analyzer 135 (e.g., the CPU 250) may then calculate the rate of equipment usage for column 426, i.e., 80%. The real time data collected for the equipment may also show that there was a downtime of 8 hours for the equipment as shown in the column 427.

Those of skill in the art will understand that there may be a distinction between downtime and non-productive time. For example, the equipment may not be operating because there is no raw material or no operator. This may be classified as non-productive time because the equipment was able to operate, but because of other production circumstances it did not operate. Whereas, the equipment may not be operating because there is an electrical or mechanical problem with the equipment itself. This may be classified as downtime because the equipment is not capable of operating until it is repaired. Each individual facility may make a determination of how to classify non-operating times to best suit the needs of the facility. Continuing with the example, the data analyzer module 135 (e.g., the CPU 250) may also calculate the rate of downtime for column 428, i.e., 4%, using the real time data for the downtime and the scheduled data for scheduled time. The data analyzer module 135 may also be used to calculate the share of blame in column 429. The details of the share of blame calculation will be described in greater detail below.

The second portion 430 of the GUI screen 420 shows similar equipment condition tracking data in bar graph form. Each piece of equipment has an identification number and the upper bar chart indicates the, downtime hours 432 and the share of blame percentage 433, similar to the manner of the columns 427 and 429, respectively. The lower bar chart 434 indicates the rate of equipment usage similar to column 426. The third portion 440 of the GUI screen 420 shows equipment tracking data in a different graphical format. In the portion 440, each of the equipment icons is grouped with the other equipment icons that are related based on the production line of the equipment. For example, the equipment 3 icon 441, the equipment 4 icon 442 and the equipment 5 icon 443 are grouped because this equipment is on press line 2 as shown by the heading over these icons 441–443. Similarly, the equipment 6 icon 444 and the equipment 7 icon 445 are grouped because this equipment is on press line 3 as shown by the heading over these icons 444–445. This is an example of where the passport information may be analyzed to produce the automated tracking data 140. As described above, the equipment passport, e.g., the equipment passports 321–324 of FIG. 9, may contain information on the line on which the equipment is located. Thus, when the data analyzer 135 is processing the information, it may use the passport information to group the equipment based on lines within the facility as shown in the third portion 440 of GUI screen 420.

In addition to the grouping, the icons 441–448 may also show real time data for the equipment. For example, each of the icons 441–448 may contain a percentage value that may be the rate of equipment usage, similar to the value shown in column 426 of the first portion 421. The icons may contain any real time data that may be collected for the equipment or static data that is stored as part of the passports or schedule. Other real time data may include a coloration of the icons 441–448 based on the equipment status. For example, a green icon may indicate that the equipment is currently operating, a yellow icon may indicate that the equipment is in nonproductive use (e.g., waiting for material, etc.) and red may indicate that the equipment is down.

Referring to FIG. 3 and similar to the product tracking information described above, the equipment condition tracking data may be displayed or printed at the station where the data analyzer 135 is located (e.g., PC screen 270), at any facility location or remote location via the corporate network connection 280, or at any location that may receive information via the main PLC 235 (e.g., the interactive screens 214 and 224 of LFSSs 210 and 220, respectively). As described above, the equipment tracking information (or any other automated tracking data 140) may also be received by the maintenance department at MSS 490 via the interactive screen 294. The maintenance department may view the equipment condition tracking data to determine if any of the equipment is down and needs to be repaired or if equipment is not scheduled for use so that preventive maintenance may be performed without interfering with actual production. Those of skill in the art will understand that there a numerous reasons why the maintenance department may desire to see the equipment condition tracking information or any of the other automated tracking data 140 generated by the data analyzer 135.

Referring to FIG. 2, the above described maintenance department scenario is shown as the automated tracking data 140 output to the maintenance department module 155 which the maintenance department may then use to service the equipment and employees 125. In addition to display information, the automated tracking data 140 may also be used for control of the facility processes. For example, the maintenance department module 155 may receive automated tracking data 140 that indicates that a specific piece of equipment is down and in addition to displaying such information, the maintenance department module 155 may generate a work order or maintenance request to repair the equipment. Similarly, the automated tracking data 140 may be used by the AEC module 150 to control the equipment and employees 125. For example, the AEC module 150 may receive automated tracking data 140 in the form of equipment condition tracking data that a piece of equipment is down. In addition to sending a display indication that the equipment is down, the AEC module 150 may also send an electrical interlock control signal to the equipment to prevent an employee from accidently attempting to start the equipment.

The STFC module 160 may also receive the automated tracking data 140 indicating that a piece of equipment is down. The STFC module 160 may use this information to reallocate production on a real time basis by relaying the information to scheduling module 115 to generate a new schedule. For example, the down equipment may be located on the second press line 20 of FIG. 1. The STFC module 160 may reallocate production to the first press line 10 to account for the down equipment in the second press line 20 and relay this information to scheduling module 115 and work order module 120 to account for scheduling and work order changes to account for this reallocation. Similarly, the LTFC module 175 may also receive the automated tracking data 140 indicating that a piece of equipment is down. The long term facility module 175 may use this information to make adjustments to schedules based on long term considerations. For example, the down equipment may result in a certain loss of production. The long term facility module 175 may determine that this loss in production will effect the end date of a particular production run and indicate to the scheduling module 115 that overtime may have to be instituted in order to meet the original end date of the production run.

The scheduling module 115 will then generate an appropriate schedule to reflect the changes affected by the LTFC module 175. As described above, this information may also effect the inventory module 107 and capacity module 112. Those of skill in the art will understand that the preceding examples of the automated tracking data 140 making control decisions for the facility process are only exemplary and that there are numerous other control decisions that may be made using various types of automated tracking data 140.

Figure 15A:
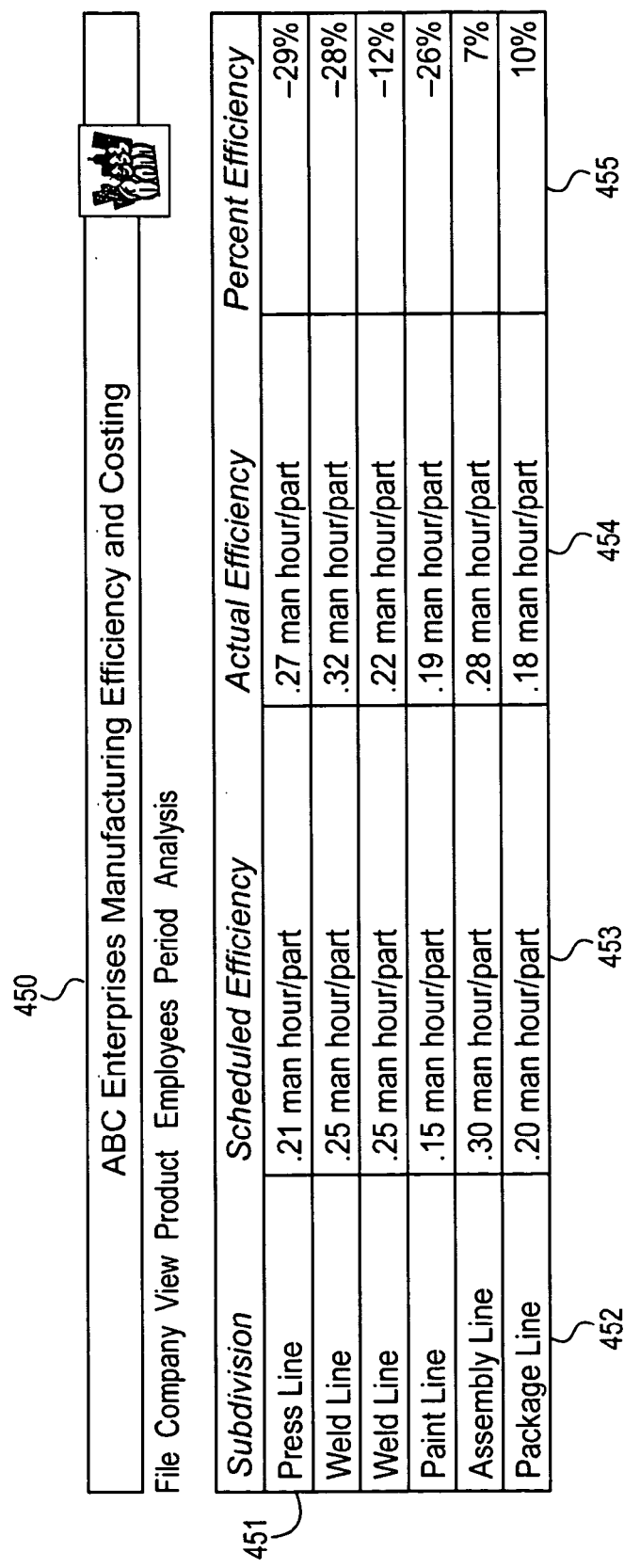
FIGS. 15a–c show exemplary graphical user interfaces displaying manufacturing efficiency and costing information according to the present invention.
Figure 15B:
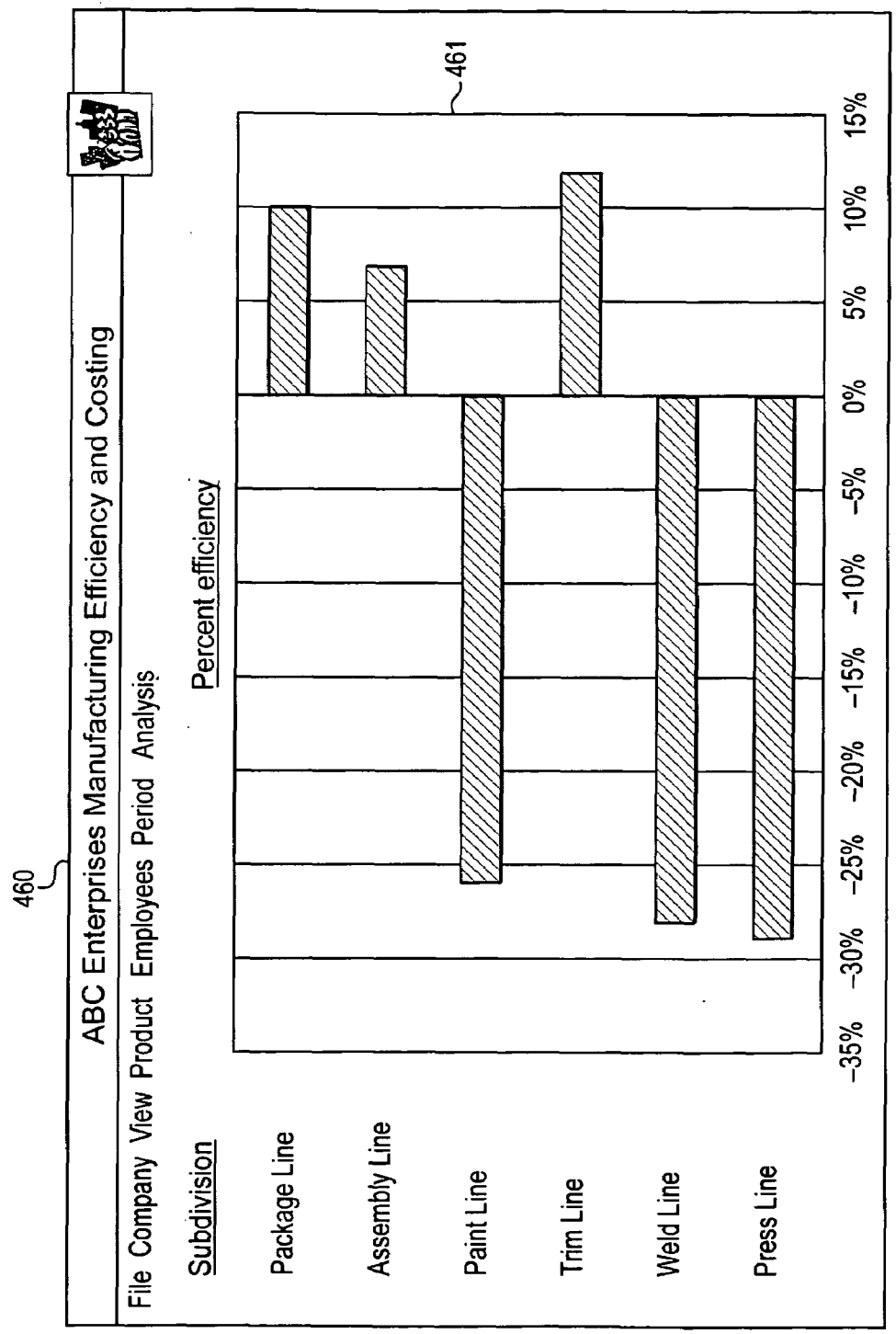
Figure 15C:
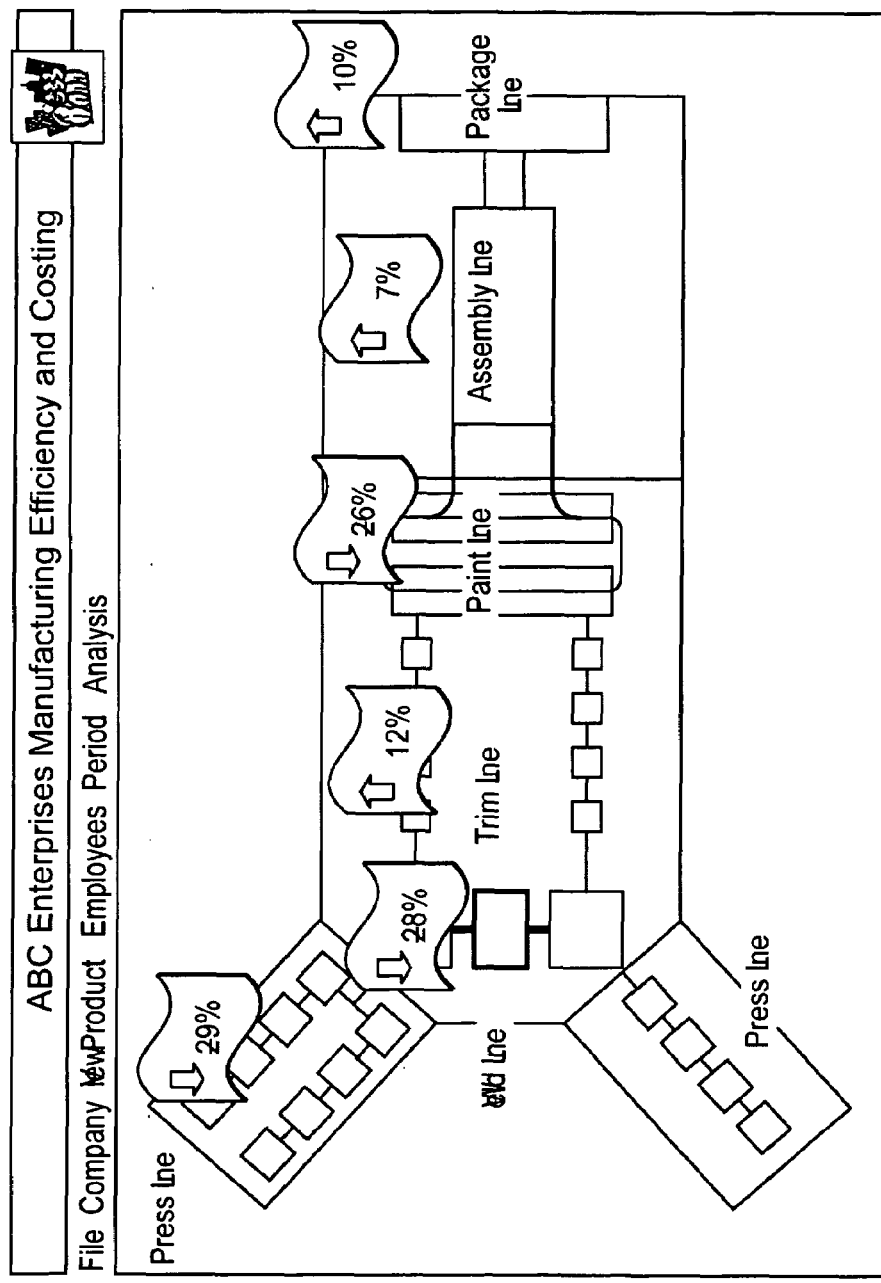

FIGS. 15a–c show exemplary graphical user interfaces displaying manufacturing efficiency and costing information which is another example of automated tracking data 140 that may be obtained from the real time data collected by the ADC module 130 and the static information from the facility permanent database module 145. FIG. 15a shows a GUI 450 having table 451 which shows the manufacturing efficiency for the different lines in the facility. The column 452 identifies the line by name. The column 453 shows the scheduled efficiency for each line. For example, the weld line 30 is scheduled to spend 0.25 man hours/part. This scheduled efficiency is calculated from static data including the generated facility schedule and the passport data. The column 454 shows the actual efficiency based on the real time data collected by the ADC module 130. Thus, in this example, the actual efficiency of the weld line is 0.32 man hours per part. Those skilled in the art will understand that the column 454 data may be a combination of real time and static data. For example, the ADC module 130 may collect real time data from an instrument showing the number of parts which leave the weld line, but the data analyzer uses the static data from the facility permanent database 145 to relate this raw real time data to the actual weld line. The column 455 shows the difference between the actual efficiency (column 454) and the schedule efficiency (column 453). For example, the difference between the scheduled efficiency and the actual efficiency of the weld line is −28%.

FIG. 15b shows a GUI 460 which has a bar chart 461 showing the percentage manufacturing efficiency of each of the lines. FIG. 15c shows a GUI 470 which also shows the percentage manufacturing efficiency for each of the lines based on a schematic of the facility floor. Lines which are exceeding the scheduled efficiency may be shown in green with up arrows and lines that are not meeting the scheduled efficiency may be shown in red with a down arrow. The percentage manufacturing efficiency numbers shown in FIGS. 15b–c may be calculated in the same manner as described for the column 455 of FIG. 15a.

Thus, a production manager may look at the displayed manufacturing efficiency values for the different lines and determine those lines which are not operating efficiently. The production manager may then focus on that line to determine the root cause of the inefficiency. For example, the production manager may determine that there is a piece of equipment that is down, a raw material delivery problem, an inefficient employee, etc. When the root cause is determined, the production manager may then address the issue in order to improve efficiency. This entire process may be done in real time so the manager does not need to wait until the end of a shift to determine if there is a problem and the proper corrective action. Inefficiencies may be corrected in real time and there may be immediate feedback on the efficiency of the line to determine if the corrective action was a proper one.

The manufacturing efficiency data may also be employed to determine the actual cost efficiency of the process. For example, the actual manufacturing efficiency for each of the lines may be determined as described above. The total efficiency for each of the lines may be the total production time for a single part. For example, referring to FIG. 15a, the total actual efficiency in each of the lines as shown by the column 454 is 1.46 hours (0.27+0.32+0.22+0.19+0.28+0.18). Thus, in this example, it takes 1.46 hours for a single part to go from raw material to packaged final product assuming each part needs to be processed at each line. The real time data collected by ADC module 130 may also indicate each employee that is presently working on each of the lines through the use of, for example, the card reader 216 of the LFSS 210. This real time data may be combined with the static data for each employee (e.g., the pay rate data in the employee passports as illustrated by FIG. 8) to determine the actual labor cost for each manufactured part. This actual labor cost may then be compared to the expected labor cost that may be included in the product passport as illustrated in FIG. 10. The production manager may use the cost data to measure efficiencies in the manufacturing process or measure changes in efficiencies based on actions taken to improve efficiencies. The sales department may use the cost data when estimating the cost to customers, etc. A more detailed method of determining actual production cost will be described in greater detail below.

Those of skill in the art will understand that there are numerous other types of efficiency information that may be derived from the real time data and the static data and numerous other uses for this efficiency data. For example, the production efficiency and cost efficiency of a single piece of equipment may be calculated to make a determination as to whether to replace the equipment. The cost of raw material and shipping may be added to the static data so that the total cost for each part may be determined. The efficiency of one employee versus another employee in a particular task may be determined. The efficiency of an employee performing a first task versus the same employee performing a second task may be determined. The production manager may then assign that employee to the task which the employee performs more efficiently. Tracking employee efficiency will be discussed in greater detail below.

Figure 16B:
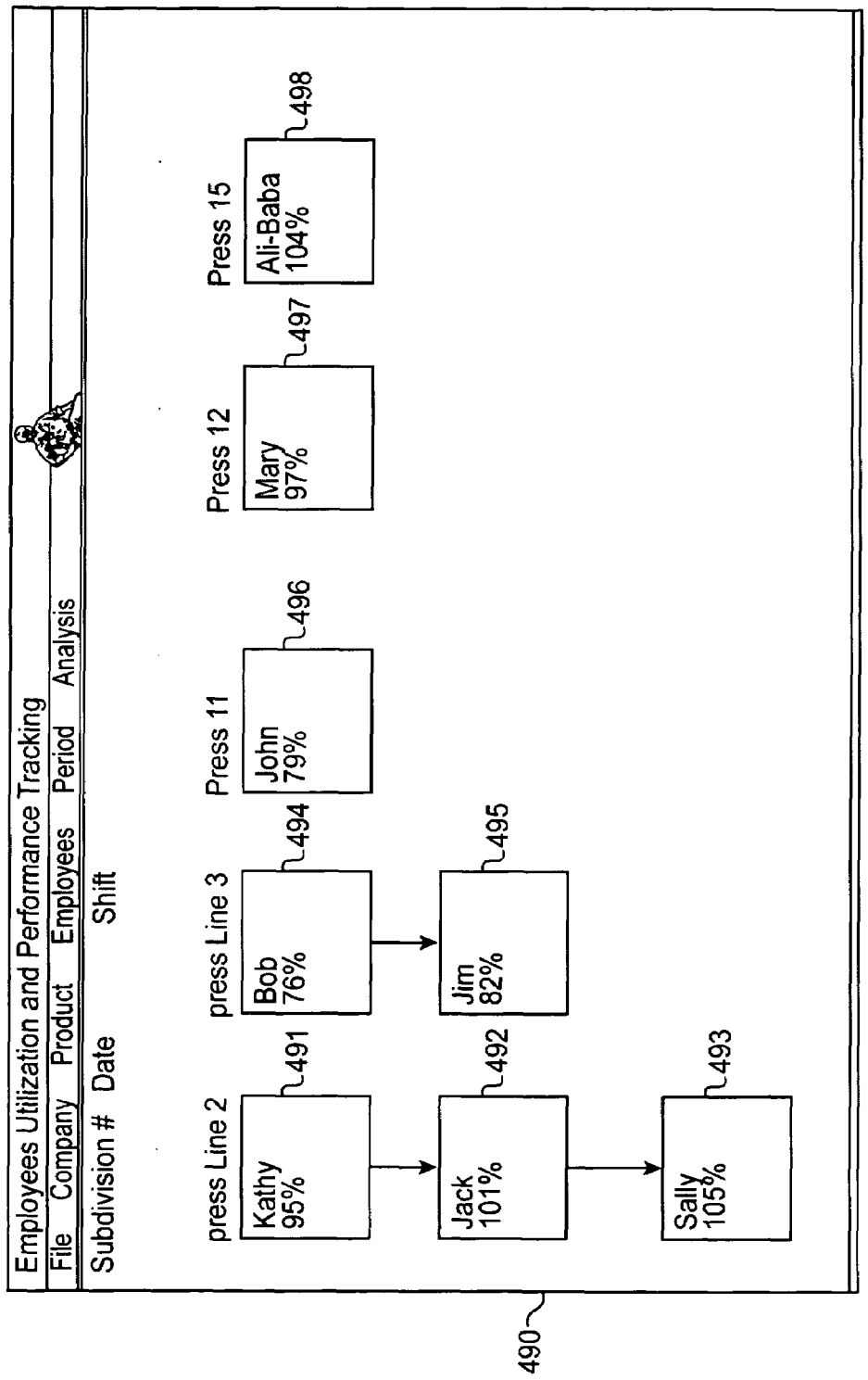

FIGS. 16a–d show exemplary graphical user interfaces displaying employee utilization and performance tracking information which is another example of automated tracking data 140. The employee utilization and performance tracking information may be used to optimize the facility floor man power structure by, for example, eliminating work hour losses, maximizing labor efficiencies, etc. FIG. 16a shows an exemplary GUI 480 having table 481 that shows employee utilization and performance for a particular shift. The first column 482 indicates the employee name and the second column 483 indicates the post number at which the employee is working. As described above, when an employee reports to a particular post or station for work, the employee may insert a time card or employee card into a device (e.g., the LFSS 210) to indicate the employee is at the post. This real time data of employee location may be reported by the LFSS 210 to the data analyzer (e.g., CPU 250 via automated collected data table 245). Thus, the data analyzer may use a combination of the real time data and the static data to determine that a particular employee is at a particular post.

The third column 484 shows the total elapsed time the employee has been at the post during the shift. The fourth and fifth columns 485 and 486 show the amount of active time and inactive time the employee has spent during the shift, respectively. Those of skill in the art will understand that the amount of active time and inactive time may be measured and reported in numerous manners. For example, if the mode switch 212 of the LFSS 210 is in the run state, this may count as active time for the employee. If the mode switch is in the off state, this may count as inactive time. In another example, the employee may be loading parts onto a conveyor system at a scheduled rate of one part every five seconds. An instrument (e.g., a photo eye) may monitor the conveyor system to determine each time a part passes on the conveyor and if a part does not pass on the conveyor after seven seconds, every second thereafter may be counted as inactive time for the employee.

The final column 487 shows the efficiency of the employee in terms of a percentage. For example, the first employee John, is shown as being at post 101 (column 483) for a total time of 5:36 (column 484) with an active time of 4:46 (column 485) and an inactive time of 0:50 (column 486) for an efficiency of 79%. The calculation of the percentage efficiency may be specific for a given post. For example, the third employee Kathy at post 103 (column 483)

has an inactive time of 1:39 (column 486) in a total time of 5:05 (column 484). However, her efficiency of 95% (column 487) is greater than the first employee John even though his inactive time of 0:50 (column 486) is less and his total time of 5:36 (column 484) is greater. This may be because it is determined that there should be more inactive time for an employee at post 103 versus post 101. Thus, a production manager may customize the efficiency calculations based on the specific task the employee is performing or the specific station where the employee is located.

The GUI 480 may also indicate employees' performance based on coloration. For example, employees that are performing below par (e.g., less than 90% efficient) may be indicated in red. Employees that are performing adequately (e.g., between 90–100% efficient) may be in yellow, while high performing employees (e.g., greater than 100% efficient) may be indicated in green. It may be possible to be greater than 100% efficient because, for example, the calculation may consider that employee is 100% efficient if the employee is active for 95% of each hour (57 minutes). If the employee is active for more than this time, it is possible to be more than 100% efficient. Once again, there are numerous uses for this data. For example, the production may see that an employee is performing below par and may determine the cause of the under performance and take appropriate corrective action. The production manager may use the shift efficiency data to determine employees who may be selected to work overtime.

FIG. 16*b* shows another GUI 490 that shows employee efficiency data based on the lines in the facility. This GUI 490 is similar to the third portion 440 of GUI 420 shown in FIG. 14. The icons 491–498 are arranged in such a manner as to show the employees on each line. For example, icons 491–493 are shown as being in press line 2 as shown by the heading above these icons 491–493. Each of the icons 491–493 may represent a station on press line 2. The icons 491–493 give the additional information of the employee that is at the station and the efficiency of that employee. This is another example of the data analyzer 135 combining both real time data and static data to indicate the state of the facility process. For example, the real time data may indicate that an employee is manning a station, the length of time the employee is manning the station, and the active and inactive time. The static data may relate the employee number to the actual employee name and the production line on which the station is located. The data analyzer 135 may then calculate the efficiency data and collate the data to be displayed on GUI 490.

Figure 16C:
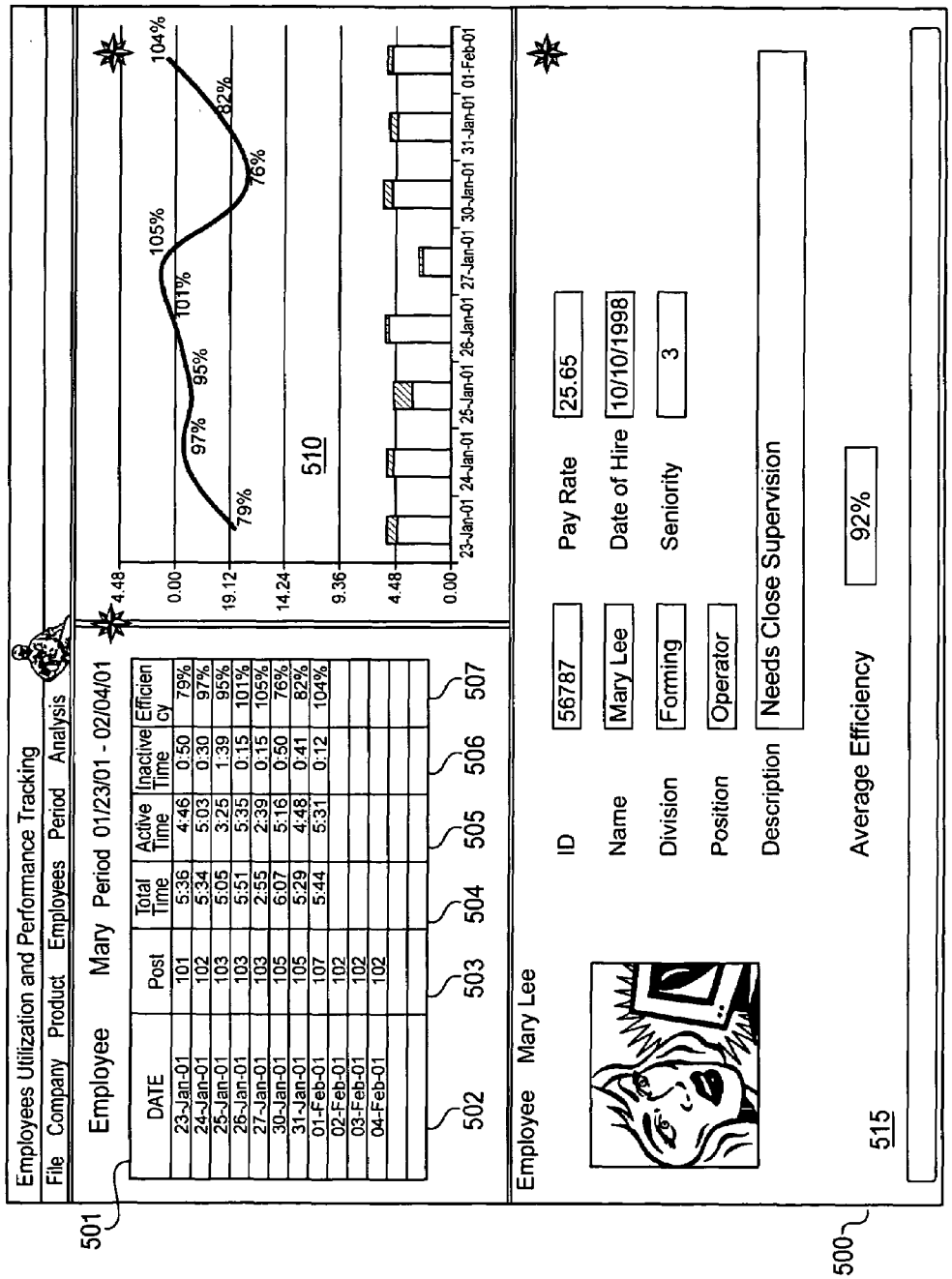

FIG. 16*c* shows another exemplary GUI 500 that tracks employee efficiency over a specified period of time. For example, referring to table 501, the employee is tracked from Jan. 23, 2001–Feb. 4, 2001. The information shown in the table includes the date (column 502), the post at which the employee worked (column 503), the total time (column 504), the active time (column 505), the inactive time (column 506) and the efficiency (column 507). The data in this table may be calculated or collected in the same manner as described above for the GUI 480 in FIG. 16*a*. The bar chart 510 of the GUI screen 500 shows the employee's daily hours with a split between active time and inactive time and the employee's efficiency above. The bottom portion 515 of the GUI screen 500 shows the data for the employee which may be, for example, the data entered in the employee passport as shown in FIG. 8. Facility management may use this data to track individual employee performance for various purposes. For example, management may use the data to determine at which post the employee is most efficient and permanently assign the employee to that post. The management may also use the data for employee review and pay raise determinations. As with all the other automated tracking data 140 described herein, facility management may select any scale of time to display the employee data. For example, for employee review purposes, management may select a time scale of one year. Whereas, for other purposes such as real time management of manpower, the time scale may be the current eight hour shift.

Figure 16D:
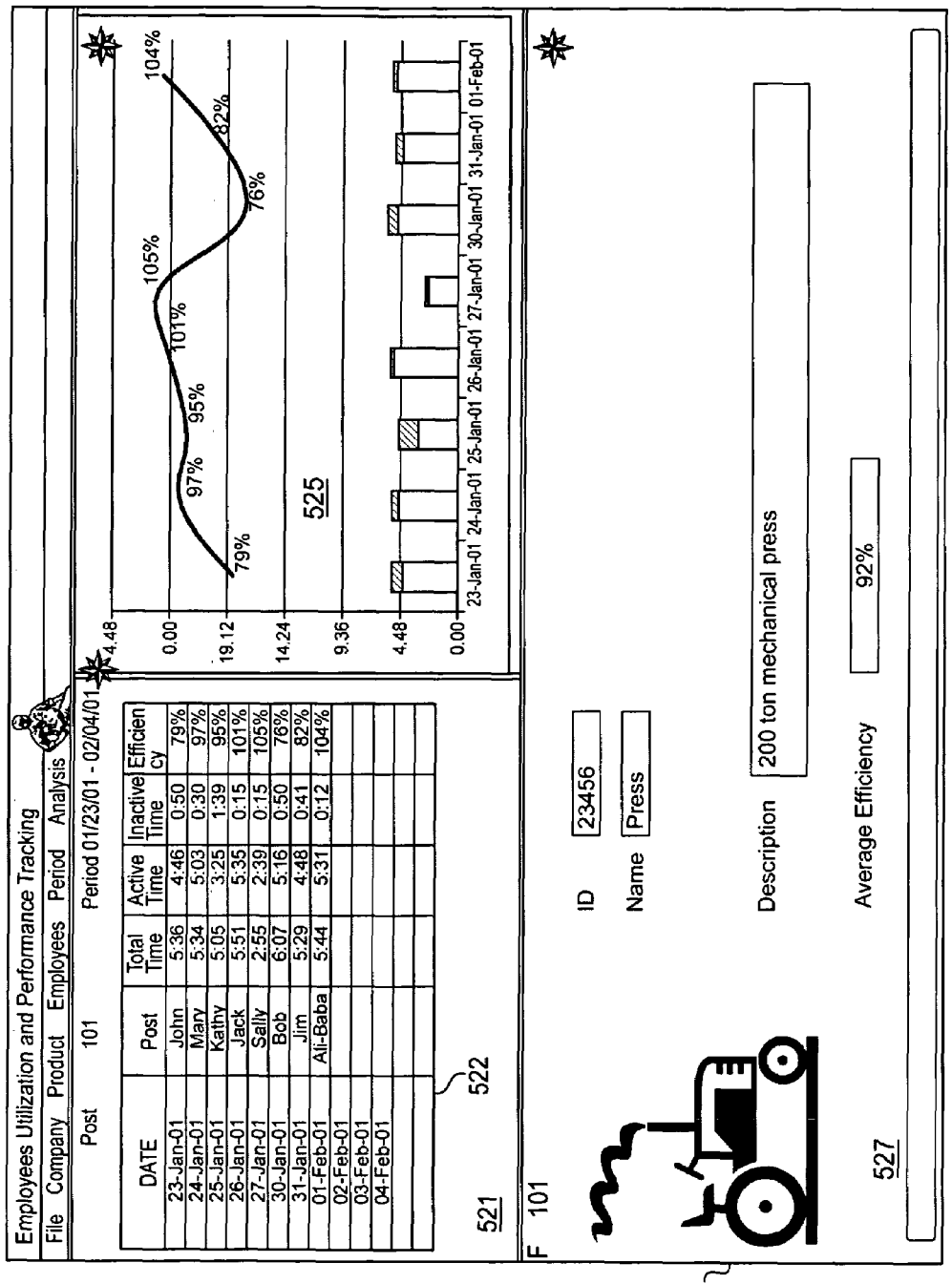

FIG. 16*d* shows another exemplary GUI screen 520 that tracks employee efficiency at a particular post over a specified period of time. As shown in the first portion 521, the table 522 shows employee efficiency at the post 101. The table 522 shows the employee efficiency data as described above, except that it is limited to the one post. The facility management may use this data to identify the employee or employees who are best qualified to work at this post. This data may also be used to identify a post having a very low employee efficiency which may indicate a problem with the post (e.g., ergonomic problems causing an inordinate amount of inactive time for the employees). The management may then take corrective action to make the post more conducive to employee efficiency, thereby improving the overall efficiency of the facility. Continuing with the GUI screen 520, it may also contain a bar graph 525 showing the employees' time at the post with a split between active and inactive time and efficiency data for each day or the selected time frame. The bottom portion 527 of the GUI screen 520 shows the data for the post (or equipment) which may be, for example, the data entered in the equipment passport as shown in FIG. 9.

FIGS. 17*a*–*e* show exemplary graphical user interfaces displaying maintenance efficiency tracking information which is another example of automated tracking data 140. As described above, when there is an equipment failure, such a failure may be communicated via the real time data to the data analyzer 135 resulting in automated tracking data 140 indicating the failure. For example, referring to FIG. 3, an employee may turn the mode switch 212 of the LFSS 210 to the off state and indicate the machine is down or other type equipment failure. This real time data is then communicated from the LFSS 210 through the main radio modem 232, the main PLC 235 and the automated collected data table 245 to the CPU 250 for processing. The processed data may then be sent to the maintenance department indicating that there has been a failure of the equipment. There may be other manners of determining an equipment failure through automatic monitoring of the equipment, e.g., instruments indicating a power failure at the equipment.

FIG. 17*a* shows a first exemplary GUI screen 530 showing maintenance efficiency tracking data in a table 531. The first column 532 shows the post (or equipment) and the second column 533 shows the amount of time the equipment may be available. The available time in the column 533 may be selected by the facility management based on the purpose of examining the data. In this example, the time frame is a single eight hour shift (480 minutes). The next column 534 indicates the down time in minutes, while the column 535 indicates the down time as a percentage of the available time. As described above, the down time may be measured from, for example, the time the employee places the mode switch 212 in a failure position, the time the automatic monitoring instruments indicate an equipment failure, etc. The next column 536 indicates the time in minutes that the repair took, while column 537 indicates the repair time as a percentage of the available time. The final two columns 538–539 indicate the response time in minutes and the response time as a percentage of the available time, respectively. The repair time and reaction time percentages, columns 537 and 539, may also be indicated as a percentage of the down time.

The repair time and reaction time may be determined in a number of manners. For example, when the maintenance employee arrives at the equipment, the maintenance employee may swipe the employee card through the card reader 216 of the LFSS 210 indicating that the repairs have started. Thus, the reaction time (column 538) may be calculated as the difference between the time that failure signal arrived at the maintenance department and the time at which the maintenance employee arrived at the equipment. The repair time may also begin when the maintenance employee arrives and end when the employee finishes the repair and leaves the station by again swiping the employee card in the card reader 216. This may end the repair time and the down time.

The maintenance efficiency tracking data may be used by the facility management to reduce the risk of lost production and costly downtime by assuring that equipment is repaired on a timely basis. For example, a production manager may see the real time data that there is an equipment failure, but the reaction time is continuing to run indicating that the maintenance department has not yet responded to the failure. The production manager may then determine the cause of the long reaction time or contact the maintenance department to alert them to the problem. The production manager or maintenance department may also determine that a particular repair is taking longer than expected and then determine the reason for the long repair time and take appropriate corrective action (e.g., assign additional employees to the repair). In addition to the GUIs described herein, any of the data which may be immediately important to facility management or others within the facility may show up as an alarm rather than just a printout. The example of an extraordinarily long reaction time may be an example of data that shows up as an alarm, visual or audio, to alert the facility management to an off normal condition. Other examples of alarm data may include, the equipment failure, an employee efficiency that has dropped below a defined threshold, a drop in actual production below a defined threshold, etc.

Figure 17B:
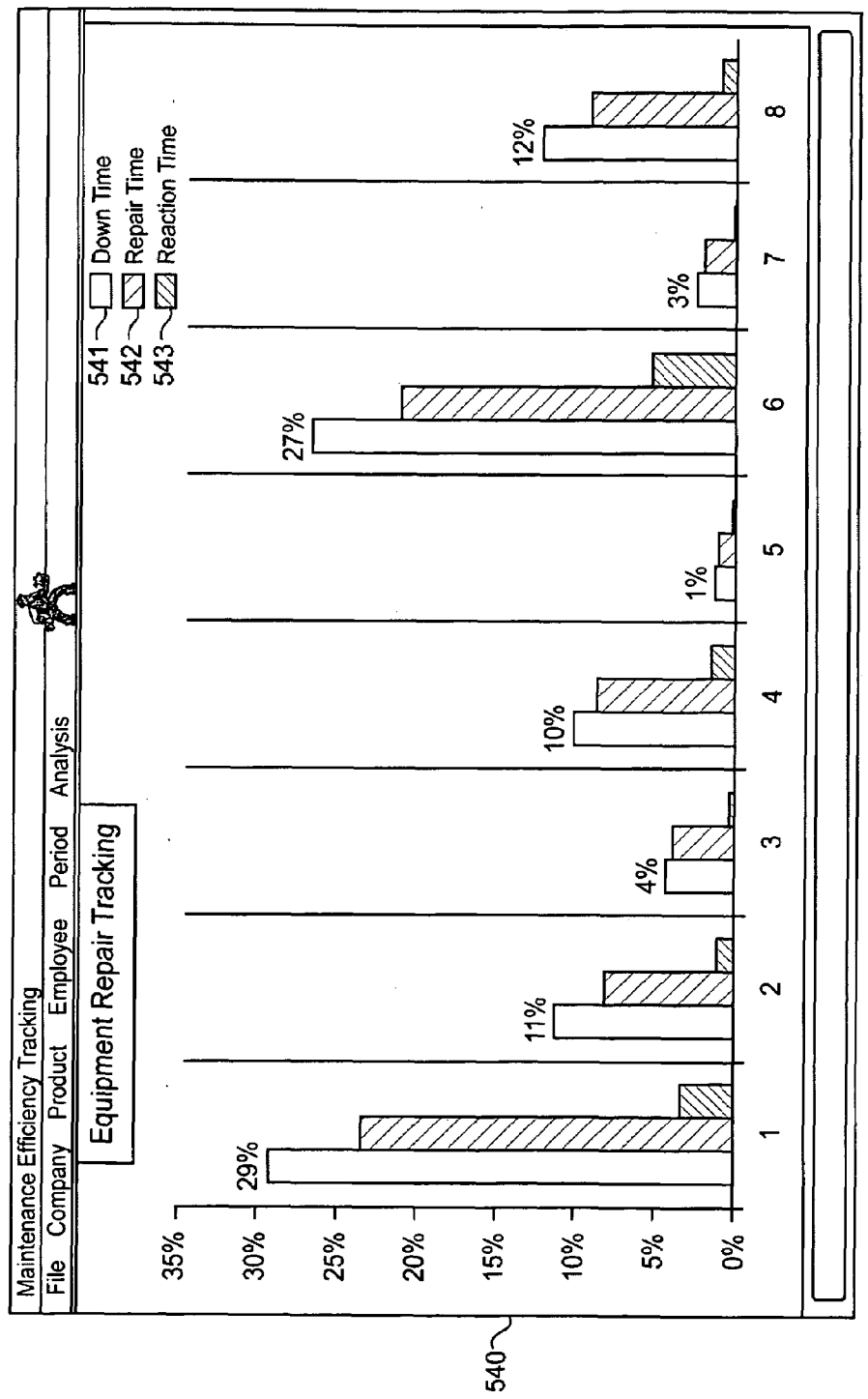

FIG. 17b shows an exemplary GUI screen 540 showing maintenance efficiency tracking data in bar chart format. This example shows the down time 541, the repair time 542 and the reaction time 543 as percentages for each of eight pieces of equipment. The calculations for each of the times 541–543 may be performed as previously described and the percentages may depend on the selection of the available time scale, e.g., one eight hour shift (480 minutes), one day (24 hours), etc.

Figure 17C:
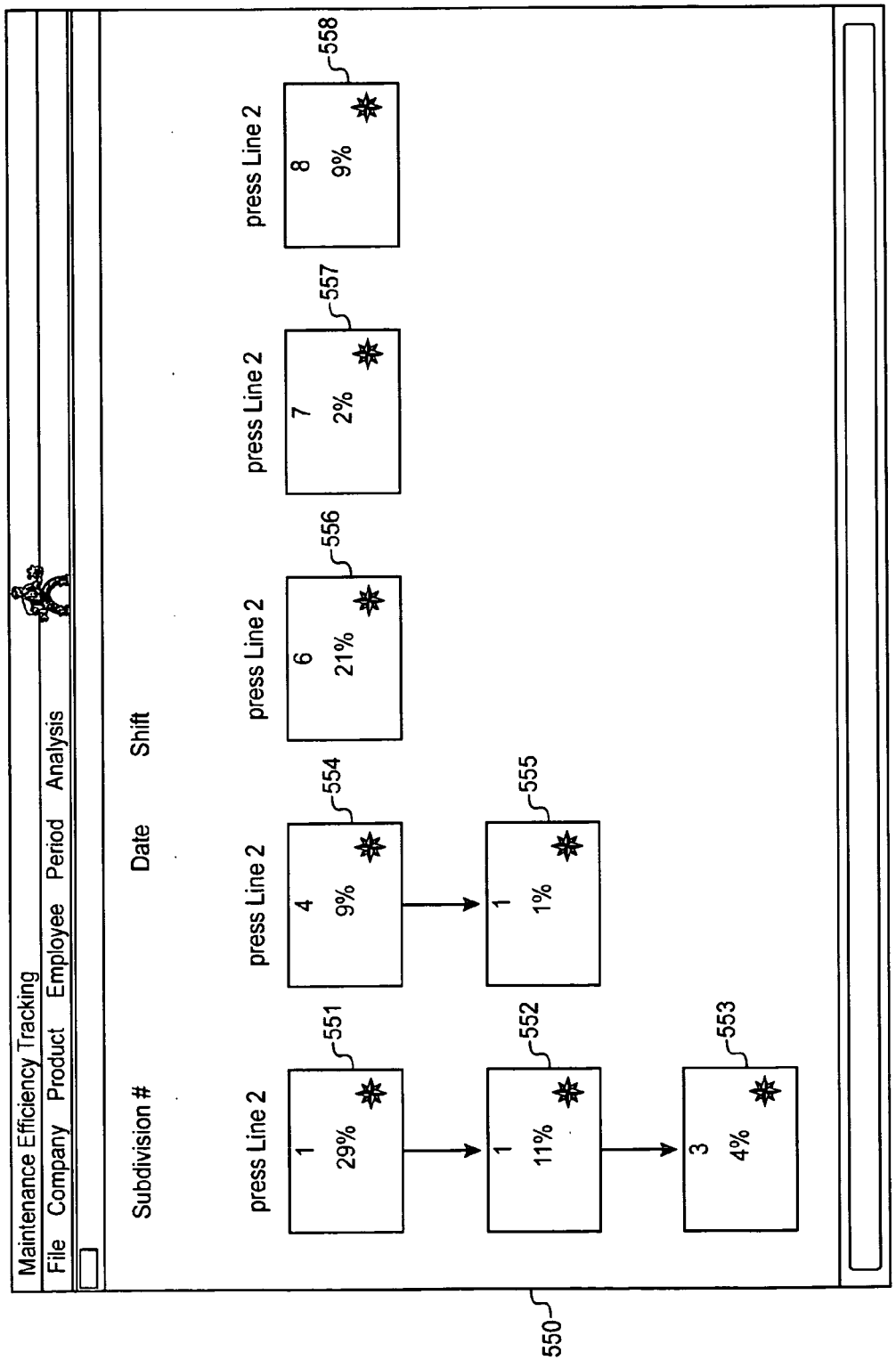

FIG. 17c shows an exemplary GUI screen 550 showing maintenance efficiency tracking data on a production line basis for the facility. As described for previous GUI screens shown on a line basis (e.g., GUI screen 420 in FIG. 14 and GUI screen 490 in FIG. 16b), the icons 551–558 represent equipment on the lines as shown in the heading. For example icons 551–553 represent equipment in press line 2 as shown by the heading. In this example, the icons 551–558 also show the percentage of down time for a particular shift (the time scale is selectable). The icons 551–558 may also display a coloration to indicate whether the down times are acceptable. For example, facility management may define that a 0–10% down time is acceptable, that 11–20% is marginal and greater than 20% is not acceptable. Thus, equipment with acceptable down times may be shown in green, marginal down times in yellow and not acceptable down time in red. The production manager may use this data, for example, to determine if there are any bottlenecks in production lines based on equipment down times.

Figure 17D:
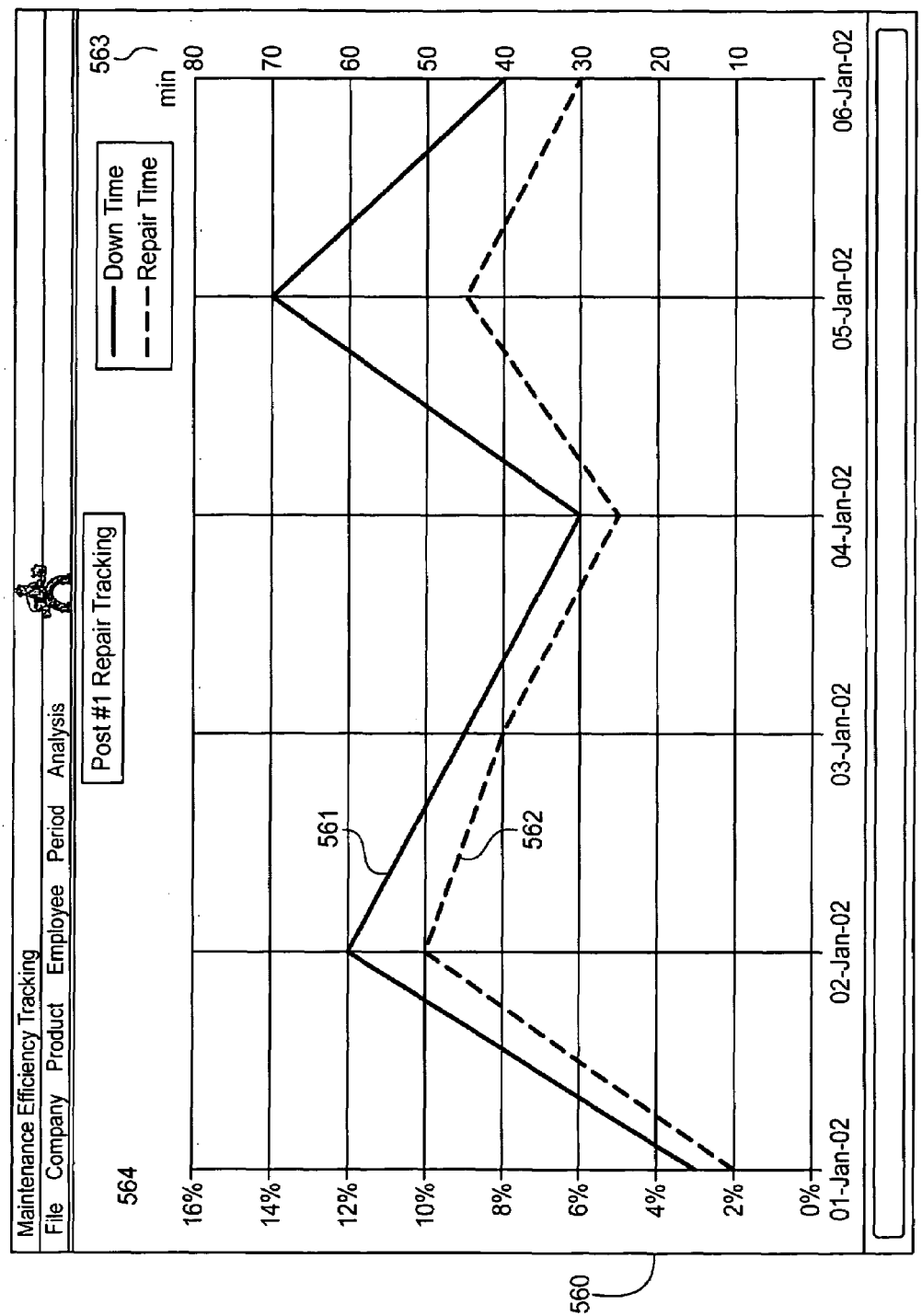

FIG. 17d shows an exemplary GUI screen 560 showing maintenance efficiency tracking data for a single post (equipment) over a time span in graph form. The total down time for the equipment is shown by line 561 over the designated time span with the total minutes shown by axis 563 and the percentage of downtime versus total available time shown by axis 564. Exemplary data and calculations to determine these values were previously described. The repair time is shown by line 562 with the same values for the axes 563 and 564. Thus, the difference between the repair time line 562 and the down time line 561 is the reaction time.

Figure 17E:
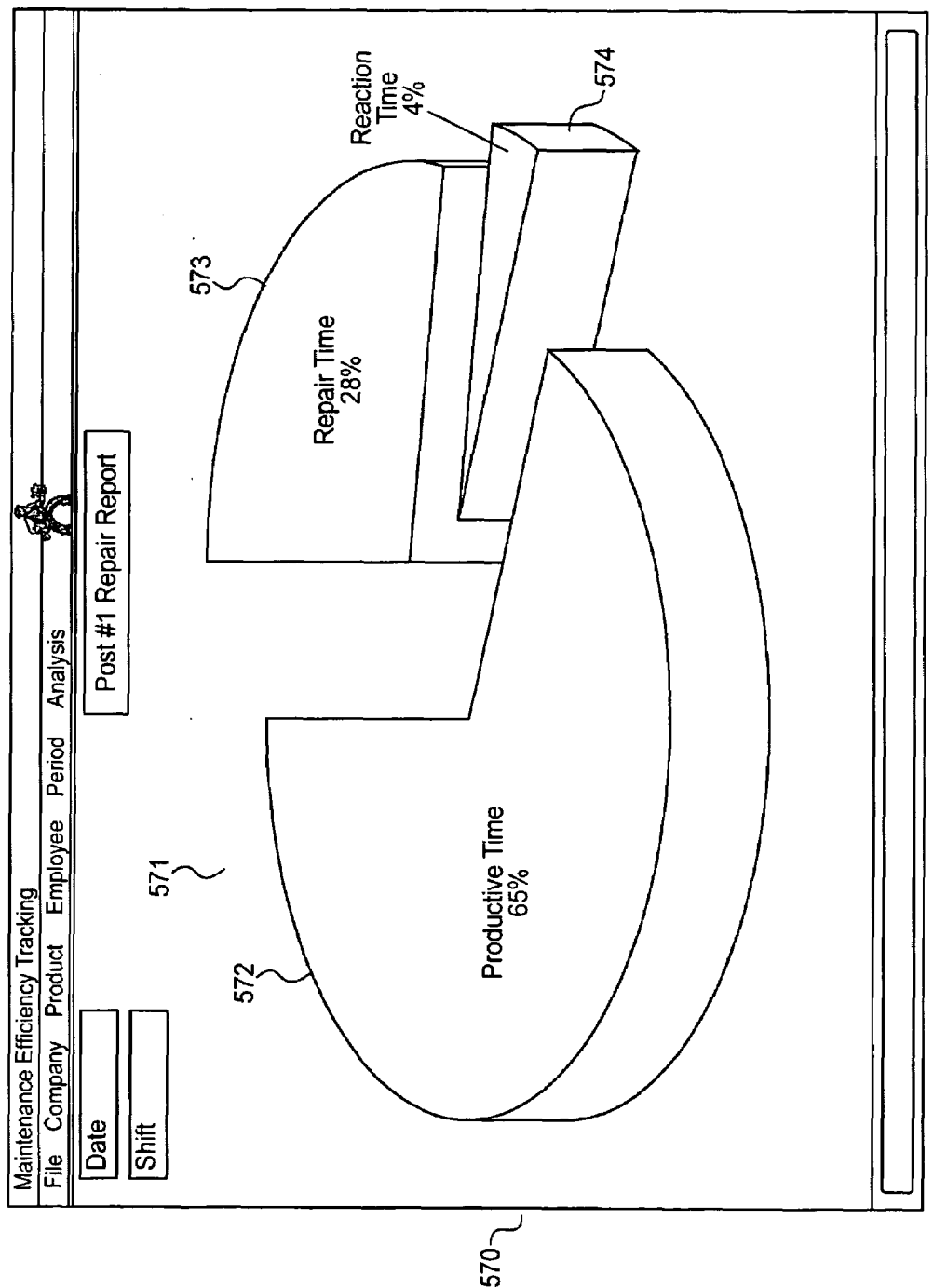

FIG. 17e shows an exemplary GUI screen 570 showing maintenance efficiency tracking data for a single post (equipment) in pie chart 571 form. The percentage of productive time is shown by section 571. The productive time may be defined as the down time (repair time and reaction time) subtracted from the total availability. Thus, the percentage of productive time is the percentage of productive time versus the total availability. The percentage of repair time is shown in section 573 and the percentage of reaction time is shown in section 574. These percentages may be calculated in the same manner as previous described. The facility management may use the data on this GUI screen 570 to evaluate the equipment and the maintenance department's record of repair for the machine.

Figure 18A:
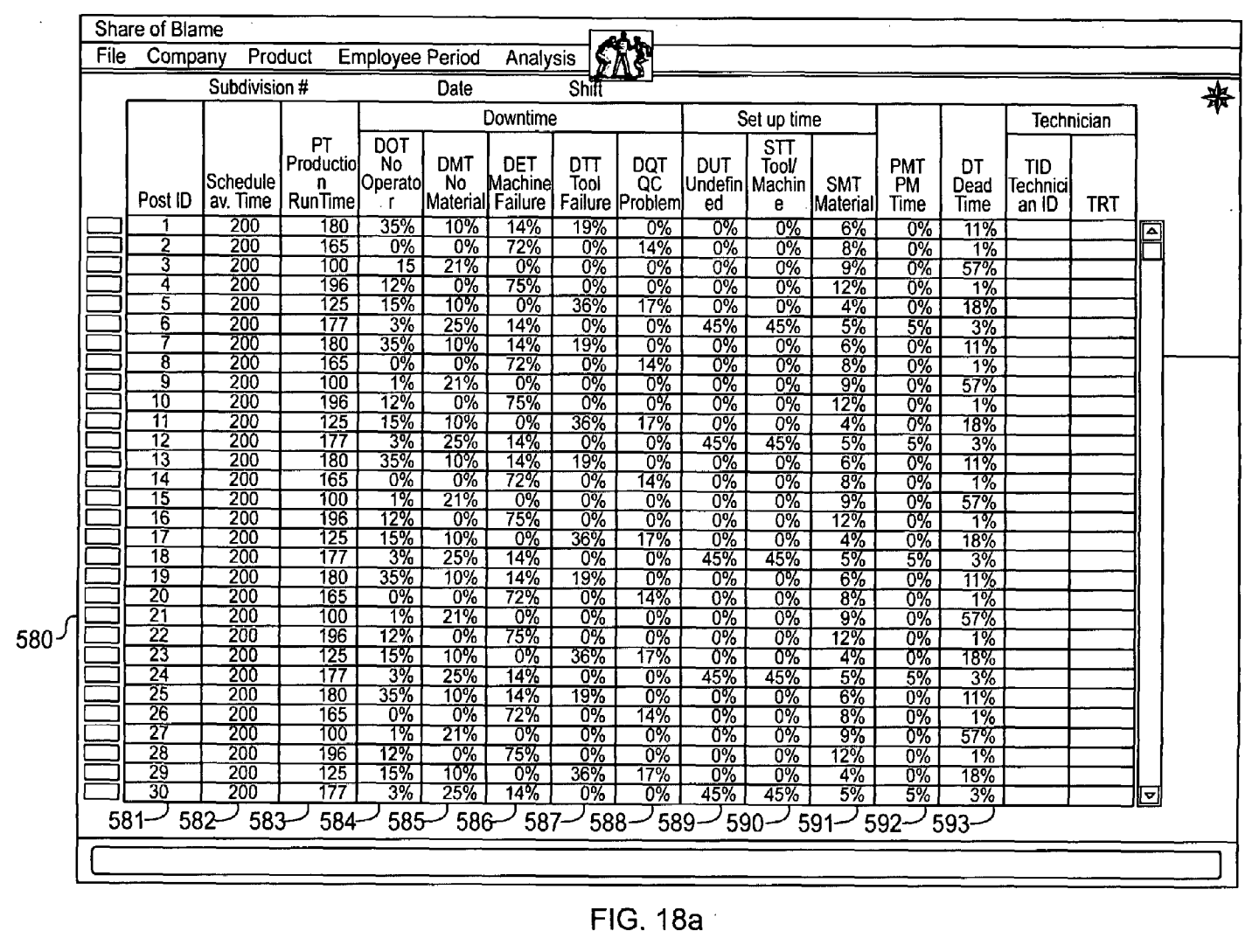
Figure 18B:
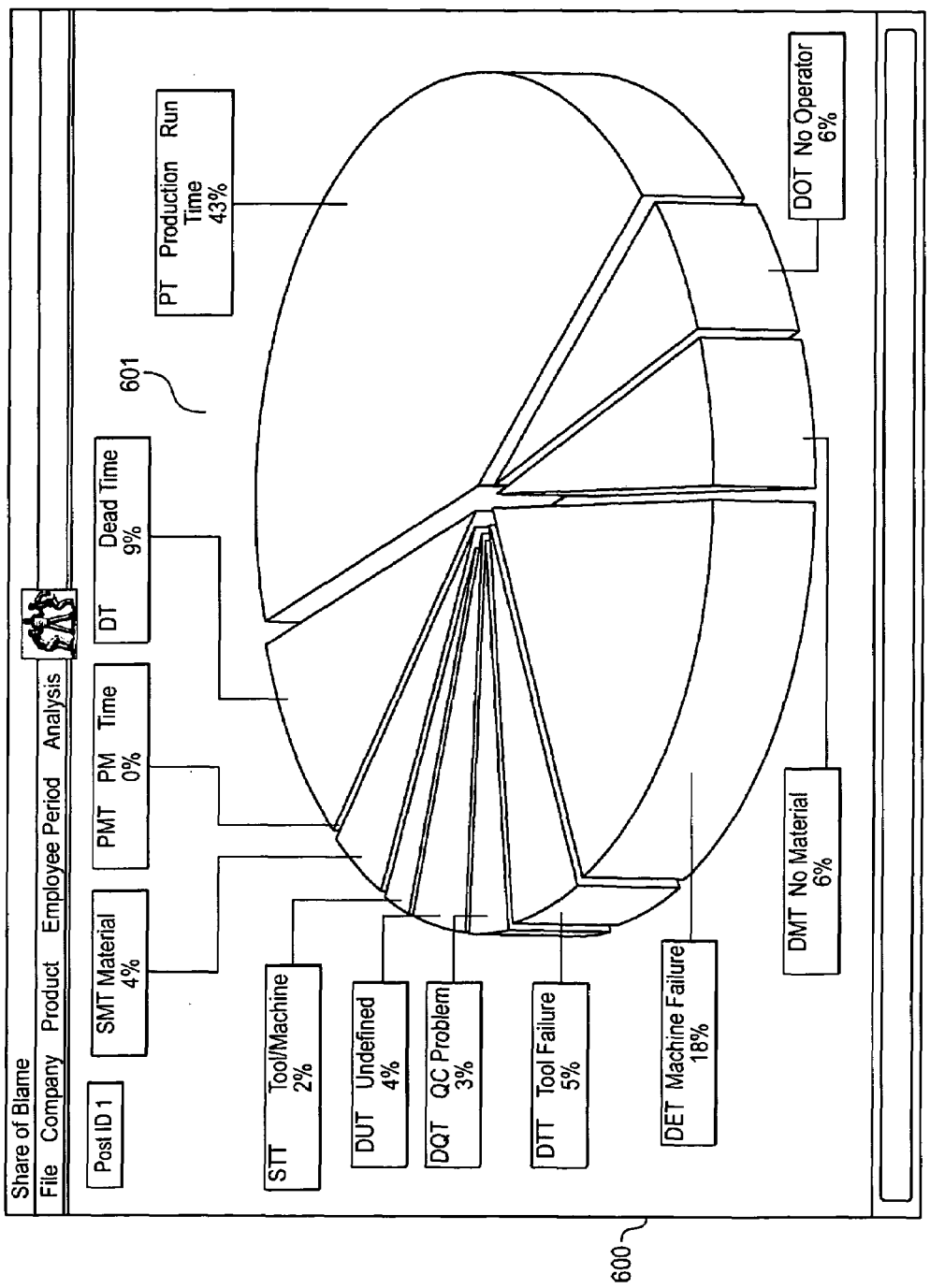

FIGS. 18a–b show exemplary graphical user interfaces displaying share of blame tracking information which is another example of automated tracking data 140. FIG. 18a illustrates GUI 580 which shows share of blame information in a table format. The post ID column 581 identifies the station being monitored. The scheduled time column 582 indicates the amount of time the equipment at the station was scheduled to operate during the designated time period (e.g., a shift). The production time column 583 indicates the amount of time the equipment operated during the designated time period. For example, the equipment at station 2 was scheduled to operate 200 minutes during a shift and it actually operated 165 of those 200 minutes. Thus, there were 35 minutes of scheduled operating time in which the equipment did not operate. The remainder of the columns 584–593 indicate the percentage breakdown of the time in which the equipment did not operate. Continuing with the example of station 2, of the 35 minutes of non-operating time, 72% was due to machine failure as indicated by machine failure column 586, 14% was due to a QC problem as indicated by QC problem column 588, etc. As previously described, the values for each of these columns 584–593 may be determined from the mode switch 212 input of LFSS 210 as recorded in the automated collected data table 245.

FIG. 18b shows an exemplary GUI 600 showing share of blame information in a pie chart graph 601. In this example, the graph 601 shows the production time as part of the graph along with the reasons for the non-productive time in the designated time period. Thus, in this example, the equipment was operating 43% of the time and was non-productive 57% of the time. The reasons for this 57% non-productive time is designated by the remaining portions of the graph 601 (e.g., 6% no material 18% machine failure, etc.). The GUI 580 of FIG. 18a and GUI 600 of FIG. 18b show examples of different types of share of blame percentages. The GUI 580 displays the share of blame percentage as a percentage of the non-productive time. The GUI 600 displays the share of blame percentage as a percentage of the total scheduled time.

The share of blame values may be used by the facility management to determine the reasons for non-productive time and implement procedures to remedy the situation. For example, it may be determined that at a particular station, the bulk of non-productive time is due to machine failure. This may prompt facility management to replace or overhaul the existing equipment. However, at another station, the bulk of the downtime may be attributed to a lack of material. This may prompt facility management to redesign the lines to assure that a sufficient amount of material reaches this station. Those of skill in the art will understand that there may be many solutions to excessive non-productive time. However, in general, these solutions cannot be implemented until facility management is aware of the root cause of the non-productive time. the present invention presents a system and method for systematically determining such root causes so that corrective action may be implemented.

It should also be noted that the system 100 may schedule and track multiple projects or production runs simultaneously. For example, there may multiple sales orders generated by sales order module 105 that are scheduled to be shipped on the same day. The system 100 may schedule, track and control the production for the multiple sales orders. In another example, there may be a reason that the production for one purchase order is started and then discontinued (e.g., lack of raw material, etc.), the system 100 may then insert another production run in order to efficiently use the facility capacity as calculated by facility capacity module 112. There may be numerous other reasons for the simultaneous production runs and the system 100 is designed to track as many production runs and/or sales orders as the facility may handle.

Referring to FIG. 2, the automated tracking data 140 is shown as output to the FFD 165 which may be used to store the historical automated tracking data. As described above, there may be numerous data inputs (real time and static) and generated data by the system 100. This data may be stored in the FFD module 165 for use by, for example, the report module 170 and the LTFC module 175. The report module 170 may query the FFD module 165 to produce standard reports for the facility. These reports may be customized for each facility and may include any combination of the real time, static, and/or generated data. Similarly, the LTFC module 175 may receive data directly from the FFD module 165 or through the report module 170 in order to perform the functions as described above.

In addition, other departments within the corporation may desire access to the data contained in the FFD module 165. These other departments may include the sales department 180, customer service 183, job costing 186, payroll 189, accounting 190 and networking 193. These departments may access the data in the FFD module 165 by, for example, setting up queries and extracting the desired information. For example, the sales department 180 may desire the know the current status of a particular sales order. By querying the FFD module 165, this information may be obtained. The job costing department 186 may desire to know the cost of certain production items. Again, by querying the FFD module 165, this information may be obtained. As described above for the output of the automated tracking data 140, these departments do not need to be local to the facility in order to obtain the desired information. The information may be networked through the use of, for example, a LAN, a WAN, a wireless network, a secure website, etc.

The communication with the departments may also be two way communication to other parts of the system 100. For example, the payroll department 189 may process a pay raise for an employee. The payroll department 189 may relay this data to the factory permanent database module 145 (e.g., the employee passport) to update the current data for the employee. Similarly, the customer service department 183 may receive a request from a customer to speed up the delivery on a particular sales order. The customer service department 183 may communicate this data to the system 100 so that the appropriate changes to the schedule and work orders may be effected in order to meet the customer request.

The system 100 may also be used as a training tool or module for plant managers, production managers, executives, etc. For example, as part of a training program, the actual automated tracking data 140 from a facility may be shown to the trainees so that they may diagnose the problems or inefficiencies in the process and suggest improvements. The data may also be used to prepare the trainees for situations they may encounter on the actual facility floor.

Figure 19:
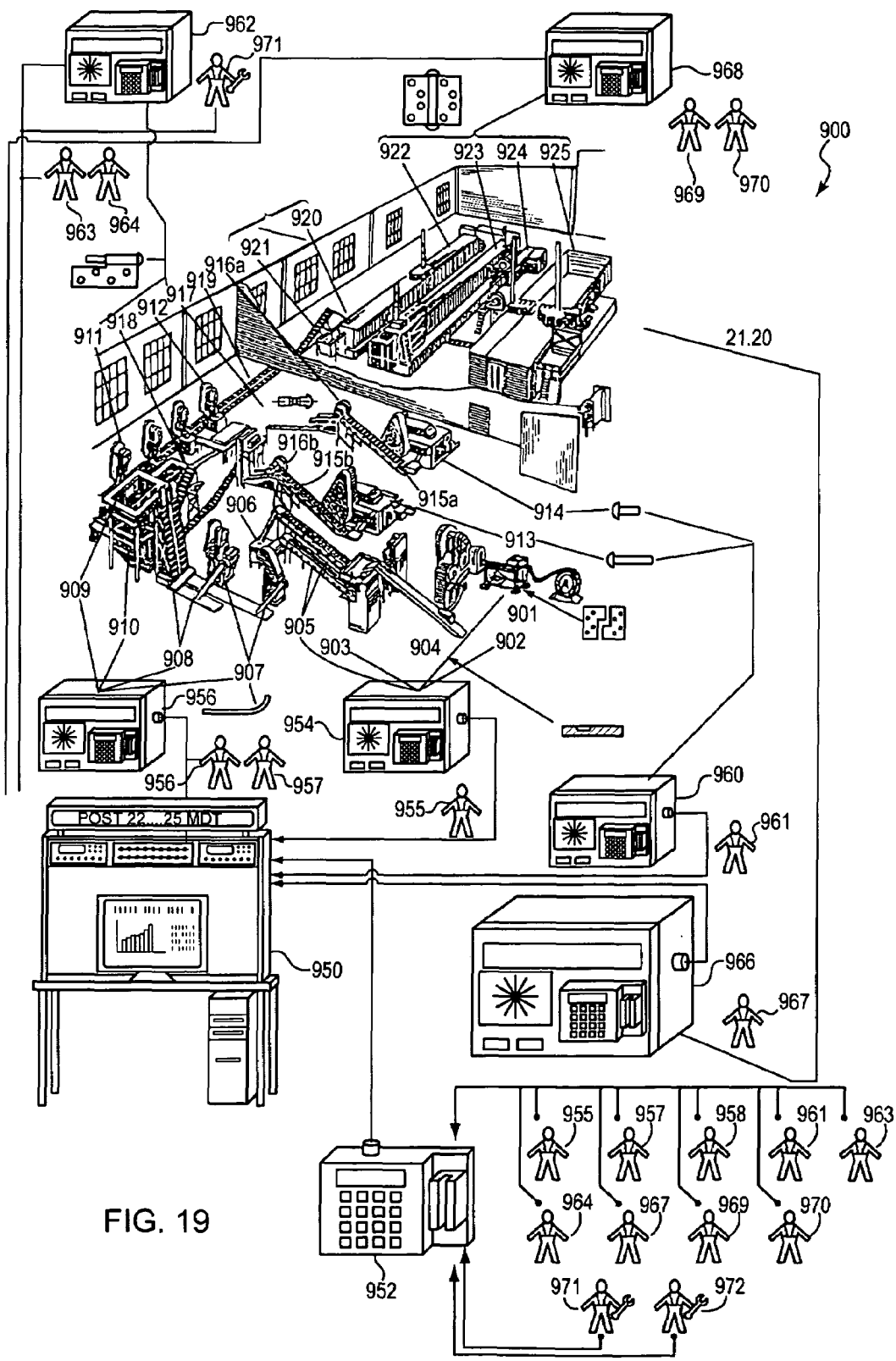
FIG. 19 shows an exemplary factory floor implementing the monitoring and control systems according to the present invention.

FIG. 19 shows an exemplary factory floor 900 implementing monitoring and control systems. In this example, the factory floor 900 is producing a hinges to be shipped to customers. In this embodiment, the factory floor 900 includes a single control station 950. The control station 950 may include some or all of the components described for control station 230 with reference to FIG. 3 (e.g., a PC, a main PLC, a PC screen, etc.). The facility management may have access to the data being displayed on the control station 950 or being sent from the control station 950 to other locations via, for example, a corporate network connection.

As shown in FIG. 19, each of the employees may slide an employee ID card through a card reader 952 when they enter the factory floor 900. The card reader 952 relays this information via, for example, a radio modem or any other connection, to the control station 950. Thus facility management knows which employees have arrived at the factory floor and the time of their arrival. The employees may then proceed to their assigned stations. The following will briefly describe the operations at each station of the factory floor and the monitoring that may occur.

The station 901 may include press equipment which takes a roll of steel or other material and forms it into the general shape of the hinge with the appropriate screw holes. The station 902 may be a conveyor station which takes the hinge pieces from the station 901 to the station 903 which orients the hinges to be in the correct position for the next operation. At station 904, the hinges are drilled to include a countersink for the heads of the screws. The station 905 is another conveyor station to move the hinges to the next station.

As shown in FIG. 19, each of the stations 901–905 is monitored by the data collection unit 954 which may be for example, the LFSS 210 described with reference to FIG. 3. The responsible employee 955 may report to these stations 901–905 and slides an employee card through a card reader in data collection unit 954 (e.g., the card reader 216 of the LFSS 210). The data collection unit 954 may then report this data, i.e., that employee 955 has arrived at stations 901–905, to the control station 950. As described above, various communication methods may be employed to communicate data from the data collection unit 954 to the control station 950 (e.g., radio modem using the Bluetooth Standard). The collected data may be stored at the control station 950 in, for example, an automated collected data table 245 as illustrated in FIG. 7. Thus, a plant manager at the control station 950 may display data indicting that the employee 955 is present at the stations 901–905.

The employee 955 may also enter additional data about the status of the process in data collection unit 954. For example, the data collection unit 954 may include a mode switch (e.g., the mode switch 212 of the LFSS 210), by which the employee 955 may enter data concerning the press equipment at station 901 and/or the drilling equipment at station 904. In addition there may be automatic collection of data by the data collection unit 954. For example, the mode switch may also collect equipment status data from sensors located on the equipment. A further example is the collection of data by, for example, a part counter (e.g., the part counter 217 of the LFSS 210), which may include an optical sensor at the station 902 to count the number of parts output from the equipment at station 901, etc. Thus, each of the stations 901–905 may include multiple sensors sending data to the data collection unit 954.

As with the employee 955 data, the additional data collected by the data collection unit 954 is communicated to the control station 950 which may analyze the data and produce, for example, the exemplary automated tracking data 140 described above. The plant manager or other responsible individual may view this data at the control station 950 (or any other location networked with the control station 950) to determine the status of the production. If the production manager notes a problem with the production, corrective action procedures may be implemented. In addition, the control station may also communicate data back to the data collection unit 954. For example, a work order or production status may be displayed on an interactive screen of the data collection unit 954 (e.g., the interactive screen 214 of the LFSS 210).

The next set of stations on the factory floor 900 include press stations 907 and 908 which form the curves to insert the hinge pins. It also may include stations 909 and 910 which separate the two portions of the hinge and may perform other functions such as cleaning of the raw metal. This set of stations 907–910 is monitored by the data collection unit 956 and operated by the employees 957 and 958 which report to the stations 907–910 by swiping their employee ID cards in a card reader of data collection unit 956. Similar to the data collection unit 954 described above for stations 901–905, the data collection unit 956 for the stations 907–910 may collect data through manual entry by the employees 957 and 958 and automatically through sensor input from the stations 907–910. The data is then relayed to the control station 950 which may analyze the data. The polling of the various data collection units on factory floor 900 (e.g., data collection units 954, 956, 960, 962, 966 and 968) may be via the request-response method described with reference to FIGS. 5 and 6.

The next set of stations 913–916 perform various functions associated with the pins for the hinge. For example, a longer pin is loaded at station 913, while a shorter pin is loaded at station 914. At stations 915a and 916a, the shorter pin is shaped and prepared to be inserted into the hinge. Likewise, at stations 915b and 916b, the longer pin is shaped and prepared to be inserted into the hinge. This set of stations 913–916 is monitored by the data collection unit 960 and operated by the employee 961 which report to the stations 913–916 by swiping the employee ID cards in a card reader of data collection unit 960. The data is collected from the stations 913–916 by the data collection unit 960 and reported to the control station 950.

The next set of stations 911–912 and 916–917 perform functions related to inserting the pins into the hinge pieces. This set of stations 911–912 and 916–917 is monitored by the data collection unit 962 and operated by the employees 963 and 964 which report to the stations 911–912 and 916–917 by swiping their employee ID cards in a card reader of data collection unit 962. The data is collected from the stations 911–912 and 916–917 by the data collection unit 962 and reported to the control station 950.

As shown in FIG. 19, there may be stations such as stations 906 and 919 which are not monitored. Thus, the control station 950 does not receive any data from these stations. To obtain information about stations which are not monitored, the plant manager may have to physically go to the station. Those of skill in the art will understand that the more stations that are monitored will give a more complete picture of the production process to the plant manager who is located at the remote control station 950. This may also allow the production manager to more effectively control the production process by either manual means (e.g., implementing corrective action procedures, changing standard operating procedures (SOPs), etc) or automatic means (e.g., schedule/work order changes, reallocation of manpower, etc.). However, there may be instances where other factors effect the ability to monitor every station within a facility, such as cost and accessability. The plant management may have to make a value judgment as to the efficacy of 1005 monitoring of all stations.

The next set of stations 920–921 may be a quality inspection station where the finished hinges are inspected prior to packaging and shipment. This set of stations 920–921 is monitored by the data collection unit 966 and operated by the employee 967 which reports to the stations 920–921 by swiping the employee ID cards in a card reader of data collection unit 966. The data is collected from the stations 920–921 by the data collection unit 966 and reported to the control station 950.

The final set of stations 922–925 perform function associated with packaging and shipping the hinges. This set of stations 922–925 is monitored by the data collection unit 968 and operated by the employees 969 and 970 which report to the stations 922–925 by swiping their employee ID cards in a card reader of data collection unit 968. The data is collected from the stations 922–925 by the data collection unit 968 and reported to the control station 950.

In addition to the employees assigned to the individual stations of the factory floor 900, there may be maintenance employees 971 and 972 which may be stationed in a maintenance shop after they swipe their employee cards in the card reader 952 indicating their arrival at the factory floor. When a piece of equipment fails or requires maintenance a signal may be sent from the data collection unit for the equipment to the control station 950. This signal may then be relayed to a device in the maintenance shop (e.g., the MSS 290 of FIG. 3) indicating the maintenance request. For example, a piece of equipment may go down at the station 911. The employee 963 may signal the failure by operating a mode switch at data collection unit 962 or an automatic failure detection signal may arrive at the data collection unit 962. The data is then relayed to the control station 950 which processes the data and sends a maintenance request to the maintenance shop. When the maintenance shop receives the request they may acknowledge the request via, for example, the respond switch 295 of the MSS 290.

A maintenance employee 971 may then report to the station 911 and indicate arrival by swiping the employee card in a card reader of the data collection unit 962. The maintenance employee 971 may indicate the repair is complete by again swiping the employee card through the card reader of the data collection unit 962. As described above, this data may be used to track the response time and the repair time for the maintenance department. The maintenance employee 971 may then be released back to the maintenance shop to continue with other duties.

Thus, the data collected by each of the data collection units 954, 956, 960, 962, 966 and 968 for each of the stations of the factory floor 900 is transmitted to the control station 950. The type of data collected at these stations has been described in detail above. However, to reiterate, the data may be any type of data that may be collected from the process. Thus, the type of data may be process dependent. The data is processed at the control station 950, e.g., in the manner described above for control station 230 of FIG. 3. The processed data may then be used by the factory management to improve the efficiency of the manufacturing process. The processed data may be displayed in the manner described above with reference to the exemplary GUIs or in any other manner which is convenient for extracting the most useful information from the collected data.

Figure 20:
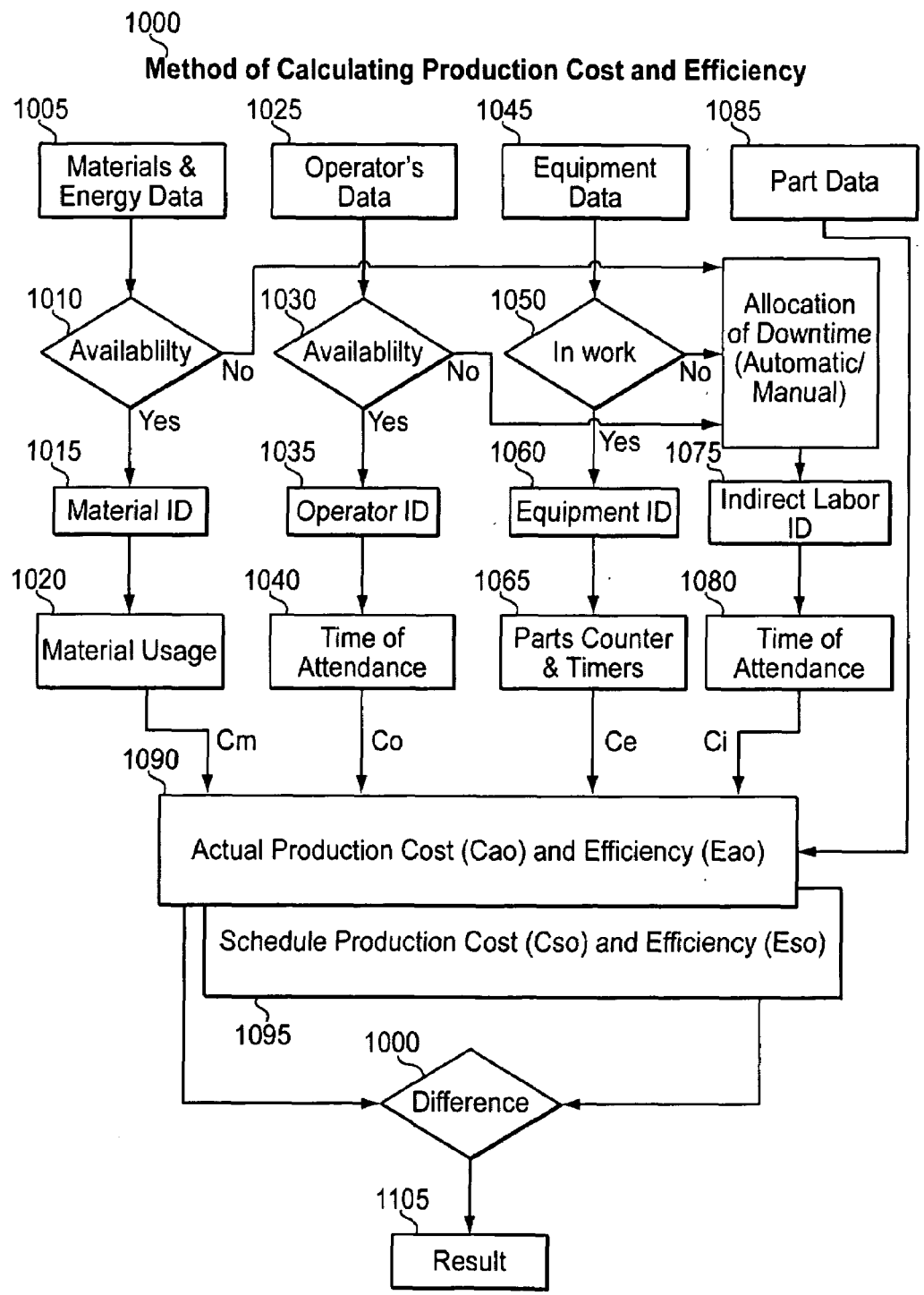
FIG. 20 shows an exemplary process for calculating production cost efficiency in manufacturing according to the present invention.

FIG. 20 shows an exemplary process 1000 for calculating production cost efficiency in manufacturing. This is an example of a method which may be employed to analyze the collected data and extract useful information for the facility management to use to improve facility efficiency and productivity. Those skilled in the art will understand that there may be numerous other methods of analyzing the data to extract additional useful information. The exemplary process 1000 will be described with reference to the factory floor 900 of FIG. 19. In addition, the steps of the process 1000 may be carried out at various locations throughout the facility, including the stations, the data collection units and the control station and various steps may be carried out at more than one location.

The first step 1005 includes the collecting of materials and energy data. As previously described there are multiple manners of collecting this type of information. For example, the station 914 may include a sensor which weighs the amount of pins which are placed on the line. Each of the stations having electrical equipment may have watt meters which indicate the energy usage of the equipment. Thus, in step 1005, this materials and energy data is collected. In the next step 1010, it is determined whether the required material is available. This determination may be made via, for example, the mode switch on the data collection units. For example, the employee 955 at station 901 may turn the mode switch of the data collection unit 954 to the off mode. The employee 955 may further indicate via the mode switch that the reason for going to the off mode is because there is no material available at the station 901, e.g. there is no steel remaining on the feeding spool. Thus, if such an indication is made the process continues to step 1070 which will be explained in greater detail below.

If the material and energy continues to be available, the process continues from step 1010 to step 1015 to indicate the material identification. Those of skill in the art will understand that on a factory floor there are numerous materials that may be monitored, e.g., steel at the station 901, large pins at the station 913, small pins at the station 914, boxes at the station 923, etc. Thus, the collected data is correlated to the actual material. For example, the weight that is sent from the station 914 via the data collection unit 960 may be correlated at the control station 950 to relate to the small pins in step 1015. This correlation may be made via the passport data described above, e.g., the passport may contain the station identification and the type of material at that station including information about the material such as cost, etc.

In the next step 1020, the material usage and the cost of this usage is calculated resulting in the cost of material (Cm). This calculation may be made using the collected data (e.g., actual weight used) and the passport data (e.g., cost per pound). Thus, the material component of the actual production cost has been calculated.

Continuing at the top of the next column with step 1025, data is collected on the operators. This type of data may include keeping track of the employees hours such as when the employee 967 swipes the employee card through the card reader of data collection unit 966. other methods of collecting employee data have been described above. The process then continues to step 1030 where it is determined if the employee is available. For example, if an employee swipes a card indicating that the employee is no longer at a particular station, the employee has become unavailable. In addition, any non-productive time of the employee may be considered as unavailable. If the employee becomes unavailable, the process continues to step 1070 which will be explained in greater detail below.

In step 1035, the operator identification is correlated with the collected data. For example, when the employee 967 swipes the employee card through the card reader of data collection unit 966, this may relay both the time information and the name of the employee so additional information concerning the employee may be correlated at the control station 950. This correlation may be made via the passport data described above, e.g., the passport may contain the employee pay rate, etc. In the next step 1040, the time of attendance and the operator data is calculated resulting in the cost of operators (Co). This calculation may be made using the collected data (e.g., time clock data) and the passport data (e.g., pay rate). Thus, the employee component of the actual production cost has been calculated.

Continuing at the top of the next column, the equipment data is collected in step 1045. For example, the part counter of the data collection unit 954 may indicate the number of hinges produced at station 901. Other types of equipment data have been described in greater detail above. In step 1050, it is determined whether the equipment is operating. For example, if the employee 963 places the mode switch of data collection unit 962 into the off mode and indicates it is due to equipment failure, the determination of step 1050 is that the equipment is not operating. If the equipment is not operating the process continues to step 1070 which will be described in greater detail below.

In step 1060, the equipment identification is correlated with the collected data. For example, the part counter data that is sent from the station 901 via the data collection unit 954 may be correlated at the control station 950 to relate to the number of hinges to the equipment at station 901 in step 1060. This correlation may be made via the passport data described above, e.g., the passport may contain the station identification and equipment identification including information about the equipment such as operating or depreciation cost, etc. In the next step 1065, the part counter and timer data is calculated resulting in the cost of equipment (Ce). This calculation may be made using the collected data (e.g., number of parts) and the passport data (e.g., operating cost). Thus, the equipment component of the actual production cost has been calculated.

If at steps 1010, 1030 or 1050, the material, operator or equipment, respectively is not available, the process continues to step 1070 to determine the allocation of the downtime. As described above, this may be manual by placing the mode switch in a certain position or automatic through sensor data. This determination will account for all the downtime on the line and therefore the cost associated with this downtime may be calculated. In the next step 1075, the cost of the indirect labor may be determined. For example, if a maintenance employee is required to repair failed equipment, such data has been collected and the cost of this indirect labor may be calculated using the collected data (e.g., repair time) and the passport data (e.g., maintenance employee pay rate). In the next step 1080 the time of attendance is calculated. For example, an employee may be absent because of sickness, disability, vacation, etc. This results in an extra cost of production because this employee needs to be replaced on the line by another employee. This cost of an absent employee is an indirect cost associated with production. Thus, the costs calculated in steps 1070–1080 result in the indirect costs (Ci) associated with production.

In step 1090, the actual production cost (Cao) and the efficiency (Eao) may be calculated. The Cao is the sum of the Cm (step 1020), the Co (step 1040), the Ce (step 1065) and the Ci (steps 1070–1080). The Eao is the Cao divided by the number of parts produced. Referring to step 1085, the part data may be collected. For example, each of the employees may enter the part number being worked at the different stations. Thus, the Cao and Eao calculated in step 1090 may be for each type of part. For example, for factory floor 900 it may be useful to calculate the Coa for the hinge piece, the small pins and the large pins individually. Then to calculate the total cost of production for the entire hinge, the Coa's of the individual parts may be summed. A similar calculation may be made for the Eao.

In step 1095, the scheduled production cost (Cso) and the scheduled efficiency (Eso) may be entered. These values may be entered in the passport data for the parts as described above. In step 1100, the difference between the Coa and the Cso may be calculated to determine if the actual production cost is meeting the scheduled production cost. Likewise, the difference between the Eao and Eso may be calculated to determine if the actual efficiency is meeting the scheduled efficiency. In step 1105, the calculation results may be displayed to the production manager for use in improving the efficiency of the facility. Thus, the method described with reference to FIG. 20, shows an exemplary manner of combining four different types of collected data (e.g., Cm, Co, Ce, Ci) and properly determining the actual production cost (Cao) and efficiency (Eao).

The following example is given to illustrate an exemplary embodiment of the present invention being implemented in a non-factory or assembly line setting. In this example, a race car (e.g., NASCAR, INDY Racing League (IRL), Championship Auto Racing Teams (CART), etc.) may contain a local data collection unit (e.g., a local PLC) which may collect data from the car and/or driver. Such data may include speed, engine temperature, oil pressure, gear changes, etc. The local data collection unit may transmit this information to a control station (e.g., master PLC) which may be manned by, for example, the pit chief. In addition, there may also be local data collection units collecting data from the pit crew members and equipment (e.g., amount of gas remaining, time to change tires, number of tire remaining, etc.). Once again, this data may be sent to the control station manned by the pit chief. The pit chief can see all this data in real time and receive automated tracking data indicating problem areas such as the engine being too hot, not enough gas remaining, too long to change tires, etc. The pit chief can then attempt to correct these problems so the racer has the best chance of winning the race. In some examples, a pit chief may be supervising more than one pit crew and racer. The present invention allows the pit crew chief to simultaneously view data on for multiple racing teams.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A method, comprising the steps of:
   collecting real time material information from a production line;
   analyzing the real time material information to determine a material cost;
   collecting real time operator information from the production line;
   analyzing the real time operator information to determine an operator cost;
   collecting real time equipment information from the production line;
   analyzing the real time equipment information to determine an equipment cost;
   collecting real time indirect cost information from the production line;
   analyzing the real time indirect cost information to determine an indirect cost;
   determining an actual production cost as a function of the material cost, the operator cost, the equipment cost and the indirect cost; and
   generating cost comparison data as a function of the actual production cost and a scheduled production cost;
   wherein the real time equipment information includes equipment failure data, and further comprising the steps of:
   transmitting the equipment failure data to a maintenance post;
   determining a response time for maintenance personnel to respond to the equipment failure data as a function of the transmitted equipment failure data and a repair time entered by the maintenance personnel in response to the equipment failure data.

2. The method of claim 1, further comprising the steps of:
   determining an actual operation efficiency as a function of the actual production cost and the real time equipment cost; and
   generating efficiency comparison data as a function of the actual operation efficiency and a scheduled efficiency.

3. The method of claim 1, wherein the analyzing of the real time material information step includes a comparison of the real time material information with stored material information.

4. The method of claim 1, wherein the analyzing of the real time operator information step includes a comparison of the real time operator information with stored operator information.

5. The method of claim 1, wherein the analyzing of the real time equipment information step includes a comparison of the real time equipment information with stored equipment information.

6. The method of claim 1, wherein the combining step includes a comparison of the real time information with stored part information.

7. The method of claim 1, further comprising the steps of:
   analyzing the real time equipment information and the real time operator information as a function of time; and
   generating a real time operator efficiency of an operator.

8. The method of claim 7, wherein the real time operator efficiency is generated for at least two operators in a production unit.

9. The method of claim 7, wherein the real time operator efficiency is generated for at least two operators in a service unit.

10. The method of claim 7, wherein generating the real time operator efficiency step includes a comparison of the real time operator information with stored operator information to determine a deviation of the operator cost from a scheduled operator.

11. The method of claim 2, wherein determining the actual operation efficiency step includes an analysis of the material cost, the operator cost, and the equipment cost.

12. The method of claim 11, wherein determining the actual operation efficiency step further includes an analysis of an energy cost.

13. The method of claim 11, wherein the material cost is a function of the operator cost and the equipment cost.

14. The method of claim 11, wherein the operator cost is a function of the material cost and the equipment cost.

15. The method of claim 11, wherein the equipment cost is a function of the material cost and the operator cost.

16. A method, comprising the steps of:
collecting real time operator information;
collecting real time equipment information;
analyzing the operator information and the equipment information as a function of time; and
generating a productivity report based on the time analyzed operator information and equipment information,
wherein the real time equipment information includes equipment failure data, and further comprising the steps of:
transmitting the equipment failure data to a maintenance post;
determining a response time for maintenance personnel to respond to the equipment failure data as a function of the transmitted equipment failure data and a repair time entered by the maintenance personnel in response to the equipment failure data.

17. The method of claim 16, wherein the function of time is based on one of a production unit and a service unit.

18. The method of claim 17, wherein the production unit is a manufactured item.

19. The method of claim 17, wherein the service unit is a completed service task.

* * * * *